(12) United States Patent
Renwart et al.

(10) Patent No.: US 11,359,534 B2
(45) Date of Patent: Jun. 14, 2022

(54) HEAT RECOVERY COMPONENT FOR AN EXHAUST GAS SYSTEM

(71) Applicant: Bosal Emission Control Systems NV, Lummen (BE)

(72) Inventors: Dominique Renwart, Hoegaarden (BE); Kristof Tamsin, Lubbeek (BE); Ronny Ceulemans, Werchter (BE); Stefan Pas, Overijse (BE); Floris De Raedt, Hasselt (BE)

(73) Assignee: Bosal Emission Control Systems NV, Lummen (BE)

( * ) Notice: Subject to any disclaimer, the term of this patent is extended or adjusted under 35 U.S.C. 154(b) by 156 days.

(21) Appl. No.: 16/145,089

(22) Filed: Sep. 27, 2018

(65) Prior Publication Data
US 2019/0101039 A1    Apr. 4, 2019

(30) Foreign Application Priority Data

Sep. 29, 2017  (EP) .................................... 17194151

(51) Int. Cl.
*F02D 9/04*     (2006.01)
*F01N 5/02*     (2006.01)
(Continued)

(52) U.S. Cl.
CPC ............. *F01N 5/02* (2013.01); *F01N 3/0205* (2013.01); *F01N 3/043* (2013.01);
(Continued)

(58) Field of Classification Search
CPC .......... F01N 5/02; F01N 3/0205; F01N 3/043; F01N 2240/02; F01N 2240/36;
(Continued)

(56) References Cited

U.S. PATENT DOCUMENTS

| | | | | |
|---|---|---|---|---|
| 5,427,141 A | * | 6/1995 | Ohtsubo | ................... F02D 9/06 137/595 |
| 6,739,579 B1 | * | 5/2004 | Rim | ......................... F02D 9/04 251/306 |

(Continued)

FOREIGN PATENT DOCUMENTS

| CN | 2303087 Y | 1/1999 |
|---|---|---|
| CN | 105189952 A | 12/2015 |

(Continued)

OTHER PUBLICATIONS

Search Report for European Patent Application No. 17194151.1, dated Mar. 26, 2018.

(Continued)

*Primary Examiner* — Harry E Arant
(74) *Attorney, Agent, or Firm* — Merchant & Gould P.C.

(57) ABSTRACT

Heat recovery component for an exhaust gas system of an internal combustion engine, comprising an inlet, an outlet, a heat recovery branch conduit comprising a heat recovery branch conduit inlet, a heat recovery branch conduit outlet, and a heat exchanger arranged in the heat recovery branch conduit, a bypass branch conduit being separate from the heat recovery branch conduit, and a valve being configured to be rotatable between a heat recovery end position and a bypass end position, the valve being arranged to be rotatable around a rotation axis located in the bypass branch conduit, wherein the valve comprises a bypass valve flap and a heat recovery valve flap, the bypass valve flap and the heat recovery valve flap being operatively connected by a support.

21 Claims, 14 Drawing Sheets

(51) Int. Cl.
  *F01N 3/02* (2006.01)
  *F02N 19/10* (2010.01)
  *F16K 31/00* (2006.01)
  *F28D 21/00* (2006.01)
  *F28F 27/02* (2006.01)
  *F16K 11/052* (2006.01)
  *F01N 13/18* (2010.01)
  *F16K 11/044* (2006.01)
  *F28F 9/00* (2006.01)
  *F28D 7/16* (2006.01)
  *F01N 3/04* (2006.01)
  *F02D 9/10* (2006.01)
  *F02G 5/02* (2006.01)

(52) U.S. Cl.
  CPC ......... *F01N 13/1827* (2013.01); *F02D 9/109* (2013.01); *F02D 9/1055* (2013.01); *F02N 19/10* (2013.01); *F16K 11/044* (2013.01); *F16K 11/052* (2013.01); *F16K 31/002* (2013.01); *F28D 7/1684* (2013.01); *F28D 21/0003* (2013.01); *F28F 9/001* (2013.01); *F28F 27/02* (2013.01); *F01N 2240/02* (2013.01); *F01N 2240/36* (2013.01); *F01N 2410/03* (2013.01); *F01N 2410/06* (2013.01); *F01P 2037/02* (2013.01); *F01P 2060/16* (2013.01); *F02G 5/02* (2013.01)

(58) Field of Classification Search
  CPC .... F01N 13/1827; F02D 9/1005; F02D 9/109; F02D 9/1095; F01P 2060/16; F01P 2037/02; F02N 19/10; F16K 11/044; F16K 11/052; F16K 31/002; F28D 7/1684; F28D 21/0003; F28F 9/001; F28F 27/02
  See application file for complete search history.

(56) References Cited

U.S. PATENT DOCUMENTS

| | | | |
|---|---|---|---|
| 2008/0128038 A1* | 6/2008 | Hutchinson | F02D 9/1095 137/862 |
| 2013/0025576 A1 | 1/2013 | Busato et al. | |
| 2013/0213606 A1 | 8/2013 | Greber | |
| 2015/0034192 A1* | 2/2015 | Hossfeld | F01N 5/02 137/625.44 |

FOREIGN PATENT DOCUMENTS

| | | |
|---|---|---|
| CN | 105829826 A | 8/2016 |
| CN | 107035486 A | 8/2017 |
| EP | 2558752 A2 | 2/2013 |
| EP | 2728156 A1 | 5/2014 |
| EP | 2942500 A1 | 11/2015 |
| EP | 3141715 A1 | 3/2017 |
| JP | 3-014323 U | 2/1991 |
| JP | 2007-285290 A | 11/2007 |
| JP | 2016-061205 A | 4/2016 |
| JP | 2016-108970 A | 6/2016 |
| JP | 2017-115682 A | 6/2017 |
| WO | 02/37001 A2 | 5/2002 |
| WO | 2011/130015 A2 | 10/2011 |
| WO | 2016/032808 A1 | 3/2016 |

OTHER PUBLICATIONS

Office Action amd Search Report for Chinese Patent Application No. 201811147607.7 (dated Jul. 7, 2021).

* cited by examiner

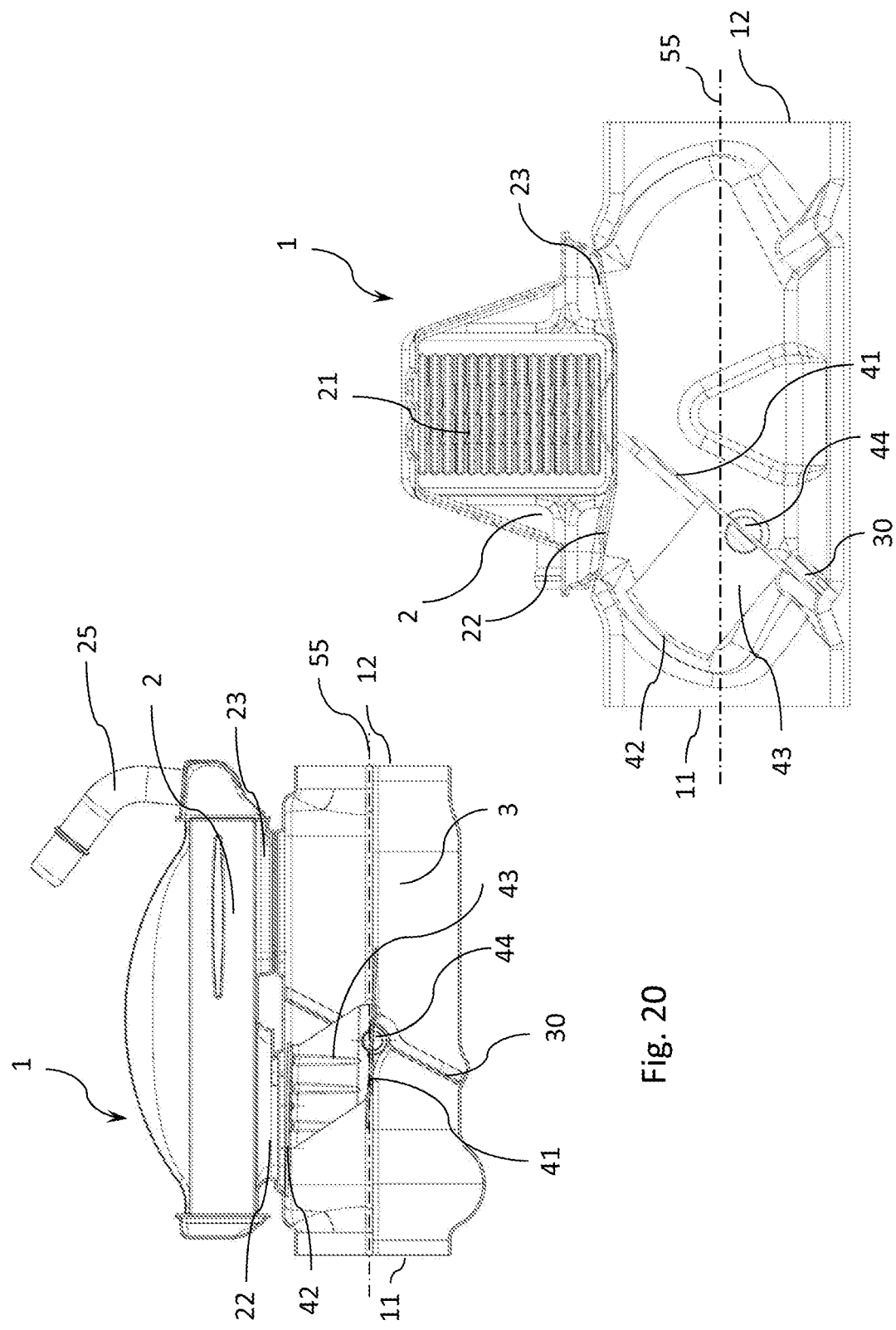

HEAT RECOVERY COMPONENT FOR AN EXHAUST GAS SYSTEM

This application claims benefit of Ser. No. 17/194,151.1, filed on 29 Sep. 2017 in the European Patent Office and which application is incorporated herein by reference. To the extent appropriate, a claim of priority is made to the above disclosed application.

The present invention relates to a heat recovery component for an exhaust gas system of an internal combustion engine. In particular, the invention relates to a heat recovery component for an exhaust gas system of an internal combustion engine of a motor vehicle, for example a car.

The requirements imposed on internal combustion engines and exhaust gas systems are becoming more and more strict regarding the emission of certain gaseous components and/or particles in order to better protect the environment. This holds in particular for, but is not limited to, internal combustion engines used in the field of motor vehicles such as cars. Thermal energy contained in the exhaust gas stream coming from the engine can be used for various purposes, for example to enhance comfort and/or to reduce fuel consumption. For instance, it has been suggested to use thermal energy (heat) contained in the exhaust gas stream of a car to more quickly heat up the passenger compartment of the car, thus increasing passenger comfort. Also, it has been suggested to use thermal energy (heat) contained in the exhaust gas stream to heat up the cooling fluid flowing through the engine and/or to heat up the engine oil and/or to heat up the transmission oil during a heating-up phase of the engine. A heating-up of the cooling fluid using thermal energy (heat) contained in the exhaust gas stream results in a quicker heating-up of the engine. This in turn results in the engine reaching the desired operating temperature at which emissions are kept at a minimum due to optimized combustion process in a shorter time after having started the engine. Additionally, once the engine has reached its operating temperature, frictional losses are reduced to a minimum compared to a cold start, leading to additional fuel economy benefits. Once the engine has reached the desired operating temperature, the cooling fluid should no longer be heated to avoid an overheating of the engine.

Exhaust gas heat recovery components have been suggested to use thermal energy contained in the exhaust gas stream coming from the engine. The use of exhaust gas heat recovery components is especially beneficial for hybrid vehicles to increase passenger comfort, to reduce harmful exhaust emissions, and to reduce fuel consumption. A faster heating-up of the cooling fluid (e.g. engine coolant fluid, transmission oil, etc.) through heat recovered from the exhaust gas allows for a very fast heating-up of the passenger compartment and reduces or avoids the consumption of electric energy from the battery for this purpose, thereby increasing the driving range of such hybrid vehicles in electric mode. When performing a cold start of a hybrid vehicle, the combustion engine can be switched off once the desired operating temperature is reached. With the aid of a heat recovery component the engine can therefore be switched off faster after a cold start, resulting in reduced emissions and reduced fuel consumption. When the transmission lubricant (transmission oil) is heated up, the lubricant is brought to the operative viscosity very fast and again allows reduced friction at a very early stage and enhanced efficiency as described above.

To recover heat contained in the exhaust gas stream and to use that heat for the heating-up of the cooling fluid, it is known to arrange a heat exchanger in the exhaust gas system. The cooling fluid flowing through the engine also flows through the heat exchanger in a heat recovery mode, so that during the heating-up phase of the engine heat contained in the exhaust gas stream is used to heat up the cooling fluid flowing through the heat exchanger. Since the heated cooling fluid then flows through the engine it additionally heats up the engine. Once the engine has reached a desired operating temperature, the exhaust gas stream is more or less prevented from flowing through the heat exchanger in a bypass mode. The cooling fluid then performs its normal function of cooling the engine and maintaining the desired temperature of the engine. In this operational mode, a further heating-up of the cooling fluid (e.g. engine coolant water) is undesired. On the other hand, the heat recovery cannot be completely reduced to zero. Therefore, although unwanted, in this operational mode there is still some heat recovered which is referred to in the following as "parasitic heat". This parasitic heat should be as small as possible since the engine coolant circuit must be dimensioned so as to be able to cope with this parasitic heat. Accordingly, the more parasitic heat occurs the larger the package space and weight of the coolant system must be in order to be able to cope with the parasitic heat.

Different constructional approaches of exhaust gas heat recovery components that can be used for the afore-described purpose in an exhaust gas system of an internal combustion engine are known from the prior art. For example, a heat recovery component suitable for this purpose is disclosed in EP 3 141 715 A1.

Exhaust gas heat recovery components are preferably arranged comparatively close to the engine where the temperature of the exhaust gas stream is very high in order to use the thermal energy (heat) contained in the exhaust gas stream as effectively as possible. However, in the direction of flow of the exhaust gas stream out of the engine, a manifold is connected to the outlets of the engine, which is then typically followed by the exhaust gas treatment components (e.g. catalytic converter, particle filter, etc.). Further in the direction of flow of the exhaust gas stream, the exhaust gas heat recovery component may be arranged. Accordingly, depending on the given spatial circumstances the heat recovery component is preferably arranged either in the engine compartment of the motor vehicle or at the beginning of the "tunnel" for accommodating the various components of the exhaust gas system (mufflers, pipes, etc.). This "tunnel" is provided in the chassis of the motor vehicle underneath the passenger compartment.

Due to the very limited space both in the engine compartment and in the "tunnel" provided in the chassis of the motor vehicle, there is extremely limited space available for accommodating the components of the exhaust gas system. Accordingly, the more voluminous a component is the more difficult it is to arrange the component in the engine compartment or in the "tunnel" provided in the chassis of the vehicle. As regards the "tunnel" provided in the chassis, the height of the component plays an even more important role as the height of the "tunnel" is limited.

The heat recovery component should be very efficient regarding heat recovery in heat recovery mode. During the heating-up phase the heat recovery component should exhibit as high a heat recovery performance as possible, that is to say as much heat as possible should be transferred from the exhaust gas stream to the cooling fluid flowing through the heat exchanger (high heat exchanger efficiency). Additionally, during bypass mode operation, for example when the engine has reached its desired operating temperature, as low an amount of parasitic heat as possible should be generated in order to prevent an undesired additional heating-up of the cooling fluid.

It is therefore an object of the present invention to overcome the drawbacks of existing heat recovery components.

These and other objects are achieved by the heat recovery component according to the invention, as it is specified by the features of the independent claim. Further advantageous aspects of the heat recovery component according to the invention are the subject of the dependent claims.

In particular, the heat recovery component according to the invention comprises:

an inlet for exhaust gas to enter the heat recovery component;

an outlet for exhaust gas to exit the heat recovery component;

a heat recovery branch conduit, the heat recovery branch conduit comprising a heat recovery branch conduit inlet being in fluidal connection with the inlet of the heat recovery component, a heat recovery branch conduit outlet being in fluidal connection with the outlet of the heat recovery component, and a heat exchanger arranged in the heat recovery branch conduit;

a bypass branch conduit being in fluidal connection with (and arranged between) the inlet and the outlet of the heat recovery component, the bypass branch conduit being separate from the heat recovery branch conduit, the bypass branch conduit allowing exhaust gas flowing through the bypass branch conduit to bypass the heat recovery branch conduit;

a valve being configured to be rotatable between a heat recovery end position, in which the valve allows exhaust gas to only flow through the heat recovery branch conduit (heat recovery mode), and a bypass end position, in which the valve allows exhaust gas to flow through the bypass branch conduit (bypass mode), the valve being arranged to be rotatable around a rotation axis located in the bypass branch conduit, wherein the valve comprises a valve shaft, a bypass valve flap and a heat recovery valve flap, the bypass valve flap projecting radially from opposite sides of the valve shaft, and the bypass valve flap and the heat recovery valve flap being operatively connected by a support.

Preferably, the valve shaft is a common rotatable valve shaft, wherein the bypass valve flap and the heat recovery valve flap being operatively connected are arranged on the rotatable common valve shaft, and wherein the rotatable common valve shaft is arranged in the bypass branch conduit.

Preferably, the valve is arranged in the bypass branch conduit. The bypass valve flap and the heat recovery valve flap being operatively connected may be arranged (or connected), via the support, on the rotatable common valve shaft. Alternatively, the heat recovery valve flap is arranged (or connected), via the support, on the bypass valve flap. The bypass valve flap may have any suitable shape, for example round, square or trapezoid with round corners. In particular, the shape of the bypass valve flap is adapted to the shape of the bypass branch conduit.

Preferably, the shape of a heat recovery valve flap is adapted to the shape of an inlet or of an outlet of a heat recovery branch conduit.

Neither the outer shape of the respective branch conduits nor the cross-section of the respective branch conduits necessarily has to be rotationally symmetrical. By way of example, the cross-section and outer shape of the branch conduits independently may have a non-rotationally symmetrical cross-section and shape.

The heat recovery component according to the invention is particularly advantageous regarding space requirements as it allows a small construction height and width and short construction length and hence a very compact overall size. It allows to be adapted to different special spatial constraints given by the engine compartment or the "tunnel" so as to allow for an optimal fit in the space actually available. The heat recovery component according to the invention also allows very efficient heat recovery in heat recovery mode. Additionally, pressure drop (due to backpressure generated by the heat recovery component) is reduced to a minimum in all operating modes—heat recovery mode and bypass mode—and thereby allows for optimal work of the engine.

Overall, the heat recovery component according to the invention is a fuel-saving, efficient, compact component having a small height to allow for arranging the component both in the engine compartment but in particular also in the "tunnel" of the chassis of a motor vehicle.

Furthermore, the heat recovery component according to the invention allows for the use of low torque actuators for moving the valve even at high gas mass flows.

Additionally, the costs of production are kept low due to few elements to be used, hence also reducing risks of failure of the heat recovery component. Furthermore, the torque for operating the valve assembly of the heat recovery component shall be as low as possible in any position of the valve.

Preferably, a support operatively, directly or indirectly connecting the bypass valve flap and the heat recovery flap is designed and arranged to provide low flow resistance, preferably, in the bypass mode and in the heat recovery mode and in any intermediate modes or during switching of the valve between different modes. The support may comprise at least one flat element extending between bypass valve flap and heat recovery valve flap. The at least one flat element is preferably arranged parallel to a fluid flow through the valve or the heat recovery component, respectively. Preferably, the at least one flat element, for example a metal sheet, is arranged perpendicular to the bypass valve flap. For example, bypass valve flap, support and heat recovery valve flap may have the form of an H-beam, with one or two flat elements forming the support between the two flaps. Alternatively, the two flaps and the support may substantially form a square in a cross section, wherein the two flaps form two opposite sides of the square and two, preferably flat, elements of the support form the two remaining opposite sides of the square.

Preferably, the support mainly consists of at least one flat element, for example one or two flat elements, arranged parallel to each other and attachment portions for fixing the support to the heat recovery valve flap and the bypass valve flap and/or the valve shaft.

Preferably, the heat recovery component comprises a bypass branch valve seat arranged in the bypass branch conduit for receiving the bypass valve flap and/or comprises a heat recovery branch valve seat arranged at the inlet or at the outlet of the heat recovery conduit for receiving the heat recovery valve flap.

Preferably, the heat recovery component comprises a bypass branch valve seat arranged in the bypass branch conduit for receiving the bypass valve flap.

Preferably, the heat recovery component comprises both a bypass branch valve seat and a heat recovery branch valve seat.

Valve seats allow for a very reliable shut-off of the individual branch conduits when the respective valve flap is in the "closed" position, when it abuts against the circumferentially running abutment surface of the respective valve seat. Hence, leakage can be reduced to a minimum.

Due to a valve seat allowing a positive stop, it is possible to determine by one single measurement of the position of the valve shaft whether the first valve flap or the second valve flap is in the "open" or "closed" position, respectively. This is advantageous as this information can be used in an engine and/or vehicle control unit of the motor vehicle.

The heat recovery valve flap operatively connected to the bypass valve flap may (directly or indirectly) be rigidly or flexibly connected to the rotatable common valve shaft.

When the heat recovery valve flap operatively connected to the bypass valve flap is (directly or indirectly) flexibly connected to the rotatable common valve shaft, an additional bypass end stop for the bypass mode may be comprised by the heat recovery component to prevent excessive deformation of the flexible element thereby resulting in permanent deformation of the flexible element. Once the heat recovery valve flap is seated, further rotation of the valve is prevented by the bypass end stop which defines the angle of the bypass valve flap in bypass end position. The additional bypass end stop also defines a more accurate bypass valve flap angle in bypass end position as the end stop is located on the fixedly arranged part of the valve.

The heat recovery component may comprise a single valve seat either arranged at the heat recovery branch conduit inlet or outlet or in the bypass branch conduit. In these cases, no valve seat is arranged at the bypass valve flap or at the heat recovery flap.

In case where no valve seat is arranged at the bypass valve flap, that is with the heat recovery valve flap being in the "open" position (e.g. during heating-up of the engine) the bypass branch conduit is not completely shut-off but the bypass valve flap which is in the "closed" position provides for sufficient resistance to the exhaust gas flow through the second (bypass) branch conduit so that the vast majority of the exhaust gas flows through the heat recovery branch conduit and heat is recovered during such period. When the heat recovery valve flap is in the "closed" position the heat recovery branch conduit is preferably completely shut-off as there is a valve seat for the heat recovery valve flap. As a consequence, practically no flow will flow through the heat recovery branch conduit and hence reach the heat exchanger and parasitic heat is minimal. In cases where a valve seat is arranged at or for the bypass valve flap only, the bypass branch conduit is completely closed in a "closed" position of the bypass valve flap (thus in the heat recovery end position of the valve) as there is a valve seat for the bypass valve flap.

On the other hand, the absence of a heat recovery valve seat and a respective design of the heat recovery valve flap may be used such that in a bypass end position, a leak passage into the heat recovery branch conduit and recovered heat may be kept minimal.

The heat recovery valve flap may (directly or indirectly) be rigidly or flexibly connected to the bypass valve flap. In particular, the heat recovery valve flap operatively connected to the bypass valve flap may (directly or indirectly) be rigidly or flexibly connected to the rotatable common valve shaft. Flexibly means that the connection allows elastic deformation, in particular movement of the heat recovery valve flap relative to the bypass valve flap. In particular, the heat recovery valve flap may be flexibly connected to the rotatable common valve shaft to allow movement of the heat recovery valve flap relative to the bypass valve flap, in particular in a plane of rotation of the valve. As such, the support, for example, may have some flexibility to allow the described movement. Springs (for example on the support or on the heat recovery valve flap) may be used to allow such movement.

In case the heat recovery valve flap operatively connected to the bypass valve flap is indirectly flexibly connected to the rotatable common valve shaft, the heat recovery valve flap may be directly and flexibly connected to the bypass valve flap. The flexible connection of the heat recovery valve flap to the rotatable common valve shaft allows for a more compact heat recovery component, as the heat recovery valve flap may move when contacting the heat recovery inlet or outlet during rotation of the valve from the bypass end position to the heat recovery end position. In other words, the flexible arrangement of the heat recovery valve flap allows for, when moving the heat recovery valve flap towards its closed position, making first contact under an angle with respect to the inlet or the outlet of the heat recovery branch, in particular with the heat recovery branch valve seat, after which it will make rotational and translational movement to its final closed position, thereby making a sliding movement over the heat recovery branch valve seat. This aspect is particularly useful to increase the compactness and reduce the weight of the entire heat recovery component.

Once the valve is in the bypass end position, the flexible connection of the heat recovery valve flap allows for a tight closure of the heat recovery inlet or outlet, thereby ensuring minimal parasitic heat to access to the heat exchanger (leak tight closure). Additionally, tight closure is obtained with exertion of force on the heat recovery valve flap due to the tension build up in the flexible connection, hence preventing rattling or even opening due to vibrations and exhaust gas pressure pulsations during operation. The flexibility of the support in this case may be designed to compensate for tolerance stack up of the different components in the construction and thus providing a self-adjusting valve. The flexible connection additionally enables soft closing of the heat recovery flap and reduces, for example, noise when the valve is moved from the heat recovery end position (or any intermediate position) to the bypass end position.

In preferred embodiments with valves with flexible connections, at least one distance between a point on the heat recovery valve flap and the rotation axis in the heat recovery mode is larger than a distance between a corresponding end point on the heat recovery valve seat corresponding to the complementary point to the heat recovery valve flap in bypass mode and the rotation axis, the distances being measured in a plane of rotation of the valve. In such embodiments, the rotation axis of the valve is preferably located within the area of the heat recovery valve seat in a projection orthogonal to the plane formed by the heat recovery valve seat.

The heat recovery valve flap may be flexibly arranged on a rigid support, in particular by a spring. The flexible arrangement of the heat recovery valve flap allows in particular a movement in a plane radial to the valve shaft.

Such 'floating' arrangement of the valve flap onto the support, in particular by a spring, allows for very easy and reliable function of the heat recovery component by allowing self-adjusting of the heat recovery valve flap when contacting the heat recovery inlet or outlet by movement of the heat recovery valve flap.

According to an alternative aspect of the heat recovery component according to the invention, the heat recovery valve flap is arranged (floatably or rigidly) on a flexible support allowing the heat recovery valve flap to move relative to the bypass valve flap by elastic deformation of the support, in particular in a plane of rotation of the valve.

Such arrangement of the heat recovery valve flap by a flexible support is advantageous for very easy and reliable function of the heat recovery component by allowing self-adjusting of the heat recovery valve flap when contacting the heat recovery inlet or outlet by movement of the heat recovery valve flap. This arrangement generally allows reducing the number of components. Additionally, the use of a heat recovery valve flap rigidly arranged on a flexible structure allows the heat recovery valve flap to be reliably used as positive stop in the bypass end position. In this specific combination, the heat recovery component may comprise an additional bypass end stop for the bypass mode to prevent excessive deformation of the flexible element potentially resulting in permanent deformation of the flexible element.

In general, the flexibility (elastic deformation) of a support is optimized to prevent that the heat recovery valve flap shall have a fluttering or vibrating movement in any position (open, or closed or intermediate) of the valve assembly during operation. The flexibility and mass or inertia of the heat recovery valve flap are designed preferably so that a resonance is not occurring in a frequency range of interest, or a resonance is not disturbing in any operating conditions.

On the other hand, rigidly means that the connection does not allow elastic deformation, in particular does not allow movement of the heat recovery valve flap relative to the bypass valve flap. If the heat recovery flap is rigidly connected to the bypass valve flap (directly or indirectly), the support is preferably a rigid element and not comprising further flexible elements connecting the heat recovery valve flap to the support. With a rigid connection, there is no translational movement of the heat recovery valve flap when in contact with the inlet or outlet of the heat recovery branch conduit since such a translational movement without flexibility could damage the valve. Thus, while this may diminish a compactness of the heat recovery component as compared to a flexible connection since the valve performs a rotational movement only, with a rigid connection, in particular with a rigid support rigidly connected to the heat recovery flap, the secure closing of a valve flap may be improved. In particular, a rattling of a valve may be reduced to a minimum or may even be completely avoided. A rigid connection or rigidity of a support may prevent that the heat recovery valve flap has a fluttering or vibrating movement in any position (open, or closed or intermediate) of the valve assembly during operation.

In embodiments of the heat recovery component wherein a heat recovery valve flap is rigidly operatively connected with the bypass valve flap, preferably, the rotation axis of the valve is located outside the area of an inlet or outlet of the heat recovery branch conduit or if present outside of the area of a heat recovery valve seat in a projection orthogonal to the plane formed by the inlet or outlet or by the heat recovery valve seat.

Independent of the provision of a flexible or rigid connection, the heat recovery valve flap may comprise a flexible seal arranged at the circumference of the heat recovery valve flap. Particularly, a heat recovery valve flap rigidly arranged with respect to a bypass valve flap may comprise a flexible seal arranged at the circumference of the heat recovery valve flap.

Preferably, the heat recovery valve seat comprises a flexible seal. In particular, a heat recovery valve flap rigidly arranged with respect to a bypass valve flap comprises a flexible seal.

The flexible seal may be made from metal wire mesh or from wire mesh covered with a thin frame of sheet metal. A flexible seal reduces the risk of disturbing vibrations. It may reduce resonances due to reduced suspended mass on a spring. Preferably, the flexible seal is made of wire mesh, which deforms elastically when exerting a force. A wire mesh adds dampening to the valve which in turn additionally reduces the risk of disturbing vibrations and/or resonances.

Preferably, the bypass valve flap is flat or comprises a flat surface.

Preferably, the heat recovery valve flap is flat or comprises a flat surface. The heat recovery valve flap may also be curved or comprise a curved surface. For example, the heat recovery flap may be made of a curved sheet material. The heat recovery flap may be convex.

A surface of the bypass valve flap and a surface of the heat recovery valve flap are arranged substantially parallel to each other another. 'Substantially parallel' herewith includes an (exact) parallel arrangement as well as a tilted arrangement of the flap surfaces to each other.

A surface of the bypass valve flap and a surface of the heat recovery valve flap may be arranged parallel to one another. If the heat recovery flap is curved, a determination of the parallelism of the flaps is measured by taking the tangent in the turning point or maximum of the curve formed by the curved flap. Also the determination of a flap with respect to a flow path may be measured by taking the tangent in the turning point or maximum of a curve if a flap is not flat but has a curved form.

Preferably, the two flaps are arranged exactly parallel to each other.

Preferably, a surface of the bypass valve flap and a surface of the heat recovery valve flap is arranged angularly rotated relative to one another in a plane of rotation of the valve. Thus, the surfaces of the two flaps may be tilted against each other such that the two surfaces include a small angle. For example, the surfaces may include a tilt angle in a range between 0.5 to 10 degree, preferably between 0.5 degree to 4 degree, most preferably 0.5° degree, 1° degree or 2 degree.

Such arrangement in an angularly rotated or tilted position may allow for use of compensation forces during operation of the heat recovery component. Thereby the exhaust gas flow affecting the parts of the valve is used to reduce the torque needed for rotation of the valve, as well as for deflection of the exhaust gas, for example into the heat recovery branch in the heat recovery end position. The arrangement may also be advantageous regarding back pressure of the exhaust gas.

The bypass valve flap projects radially from two or from both sides of the valve shaft. Preferably, at least 10%, more preferably at least 25%, very preferably 40% to 60% of the surface of the bypass valve flap is arranged on one side of the valve shaft and the complementary part of the valve flap is arranged in the opposite direction of the valve shaft. The surface area may be symmetrically or asymmetrically arranged on both sides of the valve shaft. In particular, the bypass valve flap is asymmetrically arranged on the valve shaft with respect to the valve shaft.

When the bypass valve flap projects from both sides of the valve shaft, the exhaust gas will flow on both sides of the valve shaft during operation in the bypass mode (bypass end position). For example, a significant part of the exhaust flow through the bypass branch (more than 10%, preferably more than 25%, preferably more than 40%) is flowing on one side of the shaft, and at the same time a significant part of the flow (the complementary part) through the bypass branch (more than 10%, preferably more than 25%, preferably more than 40%) is flowing on the other side of the shaft.

Such arrangement leads to a very compact design of the heat recovery component and reduces the torque needed for rotating the valve.

An asymmetric arrangement of the bypass valve flap is advantageous for compensating the weight of the heat recovery valve flap and hence reducing the torque needed for the actuation of the valve. Additionally, an asymmetric arrangement may also use compensation forces engendered by the exhaust gas flow onto the valve flap and thereby simplifying the actuation of the valve.

An asymmetric valve flap may be used for designing a fail safe behavior of the heat recovery component. Such fail safe behavior is beneficial, for example, in case the actuator would fail. The flow in the heat recovery component acting on the valve will exert a torque onto the valve so that the heat recovery component is forced by the flow into the bypass mode. This fail safe mode prevents heat to be recovered and the coolant water to be overheated. Thus overheating of an engine may be prevented since an exhaust gas flow forces the heat recovery component into or toward the bypass mode.

Another aspect is to protect an engine against high back pressure. When a backpressure becomes higher than a predetermined value, a sufficient torque will be exerted onto the valve to push the component towards the bypass mode. This second fail safe mode is in particular advantageous when no electric actuator is used but for example a wax actuator which only reacts on temperature changes.

Preferably, the bypass branch conduit has a bypass branch conduit inlet being in fluidal connection with the inlet of the heat recovery component, and a bypass branch conduit outlet being in fluidal connection with the outlet of the heat recovery component and defining a straight flow path from the bypass branch conduit inlet to the bypass branch conduit outlet, and wherein the bypass valve flap has a surface and wherein in the bypass end position the surface of the bypass valve flap is in a position from $-10°$ to $20°$, particularly from $0°$ to $10°$, more particularly from $1°$ to $5°$, very particularly from $0°$ to $2.5°$ or from $1.5°$ to $2.5°$.

In high precision heat recovery components, in the bypass end position preferably the surface of the bypass valve flap is in a position of up to $10°$ with respect to the straight flow path, more preferably between $1°$ to $5°$, very preferably between $1.5°$ to $2.5°$, for example $2°$.

In low weight, low cost heat recovery components, in particular using wax actuators and provided with a leak passage as will be described further below, in the bypass end position preferably the surface of the bypass valve flap is in a position between $-10°$ and $20°$, more preferably from $-10°$ to $10°$, for example 0 degree, with respect to the straight flow path.

Since operation of a heat recovery component using wax actuators is dependent on operation temperatures of a cooling fluid, a heat recovery component using wax actuators may comprise a range of positions defining a bypass end position.

At regular cooling temperature and thus regular operation of the heat recovery component comprising a wax actuator, a heat recovery valve flap is substantially positioned in front of the inlet or outlet of the heat recovery branch conduit and the bypass valve flap is in an open positions thus substantially parallel to a bypass exhaust gas flow defining a 'regular bypass end position'.

At extreme or maximum overheated temperature of the coolant and thus in overstroke operation of the heat recovery component comprising a wax actuator, a heat recovery valve flap is still substantially positioned in front of the inlet or outlet of the heat recovery branch conduit but rotationally displaced with respect to the regular bypass end position. The bypass valve flap is in an open position, however, provided with an overstroke. Thus, the bypass valve flap is provided with a tilt with respect to the direction of the bypass exhaust gas flow thus defining an 'overstroke bypass end position'.

Thus, in embodiments of the heat recovery component using wax actuators, a bypass end position may comprise a range of positions between and including a regular bypass end position (regular end position) and overstroke bypass end position (overstroke end position).

In a regular end position of the bypass valve flap, preferably the surface of the bypass valve flap is in a position with respect to a straight flow path through the bypass branch conduit between $-10°$ and $0°$, more preferably from $-5°$ to $0°$, for example 0 degree.

In an overstroke end position of the bypass valve flap, preferably, the surface of the bypass valve flap is in a position with respect to a straight flow path through the bypass branch conduit of up to $20°$, more preferably between $5°$ and $15°$, for example 10 degree.

The position of a surface of a bypass valve flap with respect to a bypass flow, in particular a straight bypass flow, may be optimized in view of a regular and an overstroke bypass end position. For example, if a heat recovery component with a wax actuator is generally working in a regular temperature mode, the position of the bypass flap is preferably chosen to provide low resistance in the regular bypass position. If a heat recovery component is often working in overheated temperature conditions, the position of the bypass valve flap in the regular mode is preferably selected such that the overstroke is not too large in the overstroke end position such as to not provide too much resistance in the overstroke end position.

It not otherwise indicated, the angles are measured in rotation direction of the valve when rotating the valve from the heat recovery end position into the bypass end position.

Angular arrangement of the bypass valve flap in the bypass end position additionally uses forces of the exhaust gas flow applying to the bypass valve flap to compensate and reduce torque to be applied by an actuator to the valve for the rotation. The angle may also be optimized to provide a fail safe behavior as described hereinbefore.

Preferably, the bypass branch conduit has a bypass branch conduit inlet being in fluidal connection with the inlet of the heat recovery component, and a bypass branch conduit outlet being in fluidal connection with the outlet of the heat recovery component and defining a straight flow path from the bypass branch conduit inlet to the bypass branch conduit outlet, and wherein the heat recovery valve flap has a surface and wherein in the heat recovery end position (or in an intermediate valve position (partial heat recovery) the surface of the heat recovery valve flap is arranged at an angle of from $45°$ to $90°$, particularly from $45°$ to $70°$ or from $60°$ to $70°$, very particularly from $48°$ to $54°$ or from $60°$ to $66°$ or from $64°$ to $66°$, relative to the straight flow path.

Therein, the ranges between 48 to 54 degree, for example $50°$ are most preferred ranges for the position of the surface of the heat recovery valve flap relative to a bypass flow path, preferably a straight bypass flow path, for low weight heat recovery components using wax actuators.

The ranges between $60°$ to $66°$, for example $62°$ degree, are most preferred ranges for the position of the surface of the heat recovery valve flap relative to a bypass flow path, preferably a straight bypass flow path, for high precision heat recovery components, preferably using electric actuators, a rigid support and no leak into the heat recovery component in the bypass end position of the valve.

The angular arrangement of the heat recovery valve flap is guiding the exhaust gas flow entering the heat recovery component in operation to the heat recovery branch. The obliquely arranged heat recovery valve flap in the heat recovery mode (heat recovery end position) is acting as a guiding vane, to optimize the flow, minimizing the pressure losses during full or partial heat recovery, and more specifically the pressure losses from the heat recovery component inlet to the heat recovery branch.

Preferably, the bypass branch conduit has a bypass branch conduit inlet being in fluidal connection with the inlet of the heat recovery component, and a bypass branch conduit outlet being in fluidal connection with the outlet of the heat recovery component and defining a straight flow path from the bypass branch conduit inlet to the bypass branch conduit outlet, and wherein the bypass valve flap has a surface and wherein the surface of the bypass valve flap in heat recovery end position is arranged at an angle of from 45° to 90°, particularly from 45° to 70° or from 60° to 70°, very particularly from 48° to 54° or from 58° to 64° or from 62° to 64° with respect to the straight flow path.

Therein, the ranges between 48 to 54 degree, for example 50° are most preferred ranges for the position of the surface of the bypass valve flap relative to a bypass flow path, preferably a straight bypass flow path, for low weight heat recovery components using wax actuators.

The ranges between 60° to 64°, for example 62.5° degree, are most preferred ranges for the position of the surface of the bypass valve flap relative to a bypass flow path, preferably a straight bypass flow path, for high precision heat recovery components, preferably using electric actuators, a rigid support and no leak into the heat recovery component in the bypass end position of the valve.

This aspect is particularly advantageous in that the arrangement of the surface of the bypass valve flap at an inclination angle allows for a shorter switching time of the valve flap from the first end position ("closed" or "open" position) to the second end position ("open" or "closed" position) or vice versa, as the distance (angle) the respective valve flaps must be moved (rotated) is shorter. Additionally, this aspect allows for a more compact construction of the heat recovery component and is advantageous in the selection of a suitable actuator (electric, pneumatic, wax, linear or rotating). A wax actuator is an actuator device that converts thermal energy into mechanical movement.

Preferably, in the bypass end position the heat recovery valve flap is located in a position outside of the bypass flow path through the bypass branch, in particular outside of a straight flow path through the bypass branch. Preferably, in the bypass end position the heat recovery flap is located at a position outside the bypass conduit branch.

In the heat recovery component in which the bypass branch conduit has a bypass branch conduit inlet being in fluidal connection with the inlet of the heat recovery component, and a bypass branch conduit outlet being in fluidal connection with the outlet of the heat recovery component, a straight flow path is defined as extending along a straight line from the bypass branch conduit inlet to the bypass branch conduit outlet.

This aspect allows for minimal back pressure by optimized flow through the bypass branch, thereby minimizing the pressure losses in the bypass mode.

Preferably, the bypass branch conduit is thermally separated from the heat recovery branch conduit. This helps in avoiding that the heat exchanger is exposed to an unwanted parasitic heat in the bypass mode of operation.

Preferably, the bypass branch conduit and the heat recovery branch conduit are thermally separated by an air gap arranged between the bypass branch conduit and the heat recovery branch conduit. This is advantageous with respect to reduced manufacturing expense (no heat insulating material required).

Preferably, the bypass branch conduit and the heat recovery branch conduit are thermally separated by a thermal insulating material arranged between the bypass branch conduit and the heat recovery branch conduit.

These measures further assist in protecting the heat exchanger from being exposed to parasitic heat which would lead to an unwanted heating-up of the cooling fluid during bypass mode operation. The use of a thermal insulating material is advantageous as the heat insulating material may lead to increased heat insulation when compared to air.

Preferably, the bypass branch valve seat (and associated bypass valve flap) is arranged in the bypass conduit.

The benefit of having the rotating valve shaft in the flow path of the bypass branch is a more compact construction of the heat recovery component. This arrangement allows the exhaust gas to flow on both sides of the bypass valve flap and allows a low operating torque.

In the heat recovery end position, a total exhaust gas flow through the heat recovery component flows through the heat recovery branch conduit only. Preferably, in the bypass end position, a total exhaust gas flow through the heat recovery component flows through the bypass branch conduit only. However, the heat recovery component may also be constructed such that in the bypass end position, an exhaust gas flow through the heat recovery component flows mainly or to a major part through the bypass branch conduit and a small part or small percentage of a total exhaust gas volume may flow through the heat recovery branch conduit.

Therefore, a defined leak passage may be provided between heat recovery flap and inlet or outlet of heat recovery branch conduit. The leak passage may be designed in order to let a volume in a range between 0 and 15 percent of a total exhaust gas flow, preferably between 0 and 10 percent, more preferably between 0 and 5 percent of a total exhaust gas flow through the heat recovery component pass into the heat recovery branch conduit in the bypass end position.

Preferably, in a high precision heat recovery component the leak passage is smaller than 1 percent, preferably 0 percent and exhaust gas flows through the bypass branch conduit only.

Preferably, in low weight designs of the heat recovery component comprising a leak passage of 1 percent or larger, the leak passage is preferably between 1 percent and 10 percent, more preferably between 1 percent and 8 percent, for example between 2 and 5 percent. The percentage of flow volume defined by the leak passage may be adapted to a heat exchanger efficiency (e.g. higher leak passage for low heat exchanger efficiency) or if less stringent parasitic heat requirements apply.

The leak passage as an amount of fluid flow is mainly given by the form of the heat recovery flap and a distance of the heat recovery flap to the inlet or outlet of the heat recovery branch conduit in the bypass end position. However, also other aspects may influence a leak passage such as relative pressure losses in the bypass branch conduit and heat recovery branch conduit. While a larger distance between heat recovery flap and inlet or outlet of the heat recovery branch conduit in the bypass end position generally provides for a larger leak passage than a smaller distance, the form of the flap may have an influence on the volume of the leak passage in both directions (smaller or larger volume). For example, depending on the form of the heat recovery flap some flow entering into the gap at a leading edge of the heat recovery flap may exit again out of the gap at a trailing edge of the heat recovery flap. Thus, a net flow into the heat recovery branch conduit may be reduced compared to the flow simply taking a gap size into account.

A heat recovery flap may, for example, be provided with a gurney flap at its trailing edge. The trailing edge is that end of the heat recovery flap directed away from an exhaust gas flow direction. Gurney flaps are known from aircrafts or auto racing. A gurney flap is a small tap projecting away from the surface of the heat recovery flap at its trailing edge. Preferably, the gurney flap is set at a right angle to the surface of the heat recovery flap. The gurney flap points into the general direction of the valve shaft. By providing the heat recovery valve flap with a gurney flap an exhaust gas flow passing over the heat recovery flap is partly deflected to pass along the surface of the heat recovery flap. In particular if the heat recovery flap is curved, a part of the gas flow passing over the heat recovery flap may be made to follow the curved surface of the flap and be redirected, for example back into a bypass branch conduit instead of into an inlet of a heat recovery branch conduit.

Preferably, a leak passage or a distance between heat recovery flap and inlet or outlet of the heat recovery branch conduit in the bypass end position as well as form of heat recovery flap and possibly heat recovery branch valve seat is chosen in order to keep parasitic heat at a minimum and to optimize heat recovery and on the other hand provide a sufficient safety distance for the heat recovery flap. Preferably, a safety distance is as small as possible and as large as needed to protect the valve. A safety distance may be in the range of a few tenths to a few millimeters, preferably between 0.2 mm and 3 mm, more preferably between 0.5 mm and 2 mm, for example 1 mm.

In an overstroke end position of a heat recovery component, the heat recovery flap may touch the inlet or outlet of the heat recovery branch conduit or the heat recovery valve seat.

A distance between heat recovery flap and inlet or outlet of heat recovery branch conduit or heat recovery valve seat, may by substantially constant or may be reduced between a regular end position (regular coolant operating temperature) and an overstroke end position (maximum elevated coolant temperature).

In particular, when using wax actuators for the valve, an expansion of the actuator is dependent on the temperature of the coolant, for example cooling water. Thus, if cooling water overheats, the wax continuous to expand. In order to keep the valve in a secure operating mode also at elevated temperature above regular operating temperatures, a secure distance is provided in the valve at a regular operating temperature in order to prevent damage of the valve at elevated temperatures. At a given geometrical valve design, the secure distance between heat recovery flap and inlet or outlet of the heat recovery branch conduit or recovery valve seat then mainly defines the leak passage.

Preferably, in the bypass end position of the valve, the valve allows exhaust gas to only flow through the bypass branch conduit or the valve allows exhaust gas to also flow through the heat recovery branch conduit to a maximum of 15 percent of a total exhaust gas flow flowing through the valve. In other words, in the bypass end position of the valve, the inlet or outlet of the heat recovery branch conduit is completely closed by the heat recovery valve flap or the heat recovery valve flap does not entirely close the heat recovery branch inlet or outlet but leaves a defined leak between flap and inlet or outlet.

It has been found that a leak passage at the heat recovery flap in the bypass end position in the above given range still provides a very good heat recovery in the heat recovery component due to very low parasitic heat in a bypass end position and allows the construction of a simple, low weight heat recovery component, in particular using wax actuators which are more cost efficient than for example electric or pneumatic actuators.

According to another aspect, the invention is also directed to a vehicle comprising a heat recovery component according to the invention and as described herein.

In particular, the heat recovery component is configured in operation during a heating-up phase of the internal combustion engine, to initially have the heat recovery valve flap and the bypass valve flap arranged in the heat recovery end position in which the exhaust gas coming from the internal combustion engine flows through the heat recovery branch conduit and through the heat exchanger. Thereby heating up a cooling fluid of a vehicle with an internal combustion engine flowing through the heat exchanger which is then returned as a heated cooling fluid (for example to the internal combustion engine such that the time needed to heat up the engine to a desired temperature is shortened). The heat recovery component is further configured to rotate the valve shaft once the internal combustion engine has reached the desired temperature, such that the exhaust gas coming from the combustion engine no longer flows through the heat recovery branch conduit but preferably only or to a major part flows through the bypass branch conduit.

The cooling fluid may be the cooling fluid of the engine or the lubricant of the transmission. The cooling fluid may be water or oil, such as ICE coolant water, ICE coolant oil or transmission oil. The heat transfer to the cooling fluid may be done directly by directing the cooling fluid through the heat exchanger arranged in the heat recovery branch conduit. The heat transfer to the cooling fluid may be alternatively done indirectly by operating an intermediate heat exchanging circuit. The intermediate heat exchange circuit is a closed fluid circuit and comprises a heat exchanging fluid passing through the heat exchanger arranged in the heat recovery branch conduit. The heat exchanging circuit comprising the cooling fluid of the vehicle is then in thermal exchange with the intermediate heat exchange circuit for heating up the cooling fluid.

This aspect is advantageous as it enables a shortened time period for heating-up of the engine to a desired temperature, and once the engine has reached the desired temperature, the heat exchanger is bypassed and parasitic heat is minimal.

Each and every feature described herein, and each and every combination of two or more of such features, is included within the scope of the present invention provided that the features included in such a combination are not mutually inconsistent. In addition, any feature or combination of features may be specifically excluded from any embodiment of the present invention.

Further advantageous aspects will become evident from the following detailed description of embodiments of the invention with the aid of the drawings in which:

FIG. 20 shows a cross sectional view of an embodiment of the heat recovery component with rigid flap connection;

FIG. 21 shows a cross sectional view of an embodiment of the heat recovery component in the bypass end position with curved heat recovery flap and leak passage;

Figure 1:
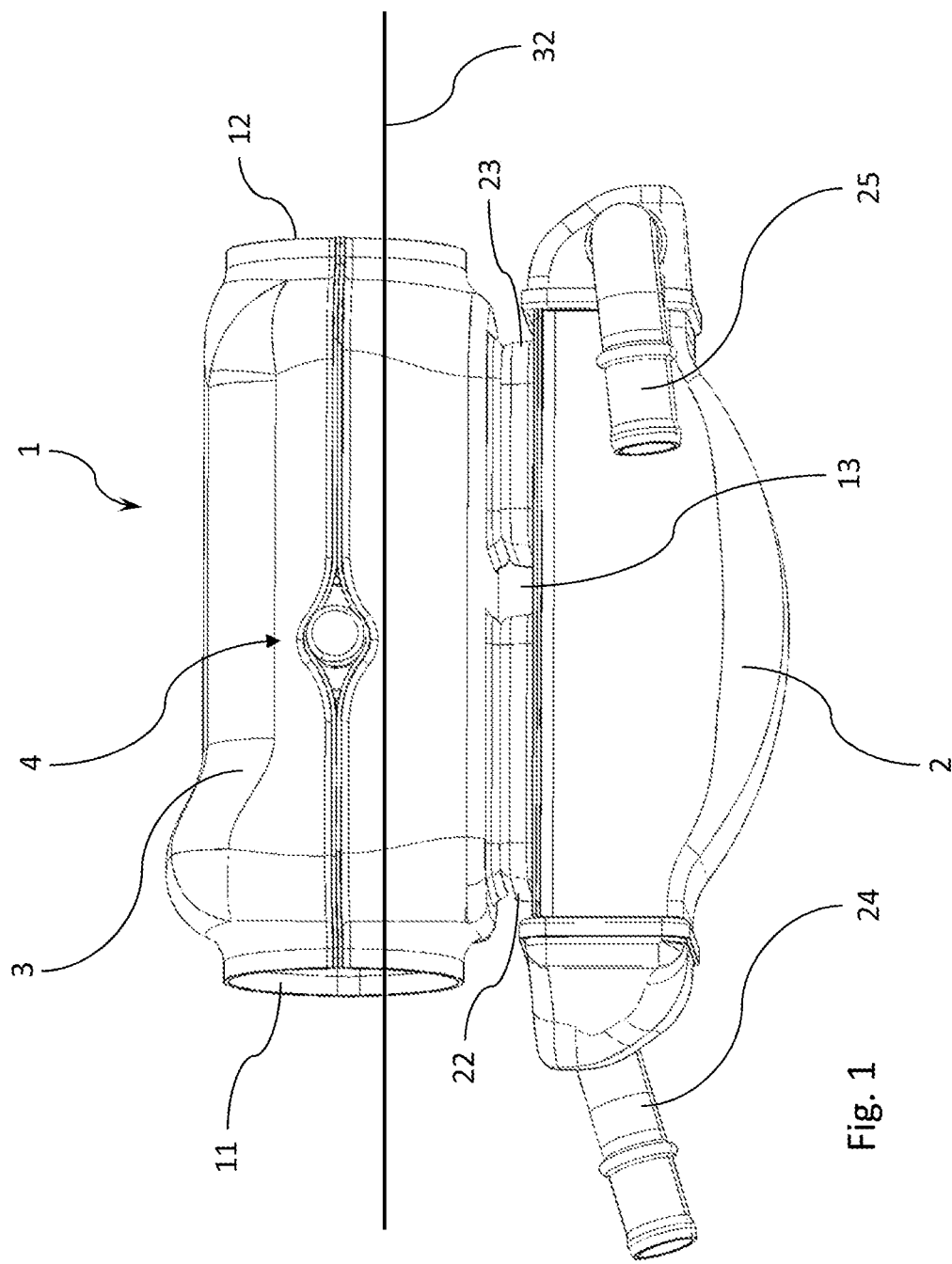
FIG. 1 shows a perspective view of an embodiment of the heat recovery component according to the invention.

Various aspects of the heat recovery component according to the invention have been described with the aid of the embodiments shown in the drawings. However, the invention is not limited to the embodiments or the particular combination of aspects shown in the embodiments, as various changes and modifications to the shown embodiments are conceivable without departing from the technical teaching underlying the invention. Therefore, the scope of protection is defined only by the appended claims. The subject matter is described with reference to the drawings, wherein like reference numerals are used to refer to like elements. In the following description, for purposes of explanation, numerous specific details are set forth in order to provide a thorough understanding of the subject matter. It can be evident, however, that subject matter of embodiments can be practiced without these specific details.

FIG. 1 shows an embodiment of the heat recovery component 1 according to the invention. The heat recovery component 1 comprises a heat recovery branch conduit 2 and a bypass branch conduit 3. The heat recovery component 1 has an inlet 11 for the entrance of the exhaust gas and an outlet 12 for the exhaust gas to leave the heat recovery component 1. The heat recovery branch 2 comprises a heat exchanger (not shown) for recovering thermal energy from the exhaust gas when the heat recovery component 1 is in heat recovery mode. The thermal energy contained in the exhaust gas is used for heating up of the cooling fluid of the engine or of the transmission. The cooling fluid is conveyed to the heat recovery component 1 and enters the heat exchanger arranged in the heat recovery branch 2 by the heat exchanger cooling fluid inlet and outlet 24, 25. The cooling fluid inlet and outlet may be arranged the other way around. The heat exchanger cooling fluid inlet and outlet 24, 25 are each connected to a manifold 26, 27 for distribution of the cooling fluid over the section of the heat exchanger. The heat recovery branch 2 has a heat recovery branch conduit inlet 22 which is in fluid connection with the inlet 11 of the heat recovery component 1, and a heat recovery branch conduit outlet 23 which is in fluid connection with the outlet 12 of the heat recovery component 1. A valve 4 is arranged in the interior space of the bypass branch 3 for conveying the exhaust gas either through the bypass branch or through the heat recovery branch (partially or completely). The heat recovery branch 2 is thermally separated from the bypass branch by an air gap 13. The air gap 13 allows for reducing parasitic heat which would further heat up the cooling fluid in the bypass mode in which a heating up of the cooling fluid is not desirable. Alternatively or in addition to the air gap, a thermal insulating material may be arranged between the bypass branch 3 and the heat recovery branch 2.

Figure 3:
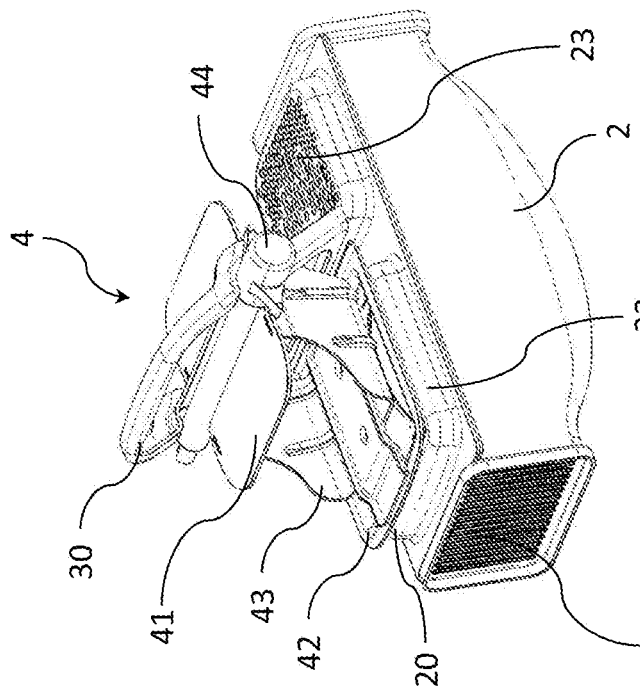
FIG. 3 shows a perspective view of the embodiment of the heat recovery component of FIG. 2 without the cooling fluid manifolds and pipes.
Figure 2:
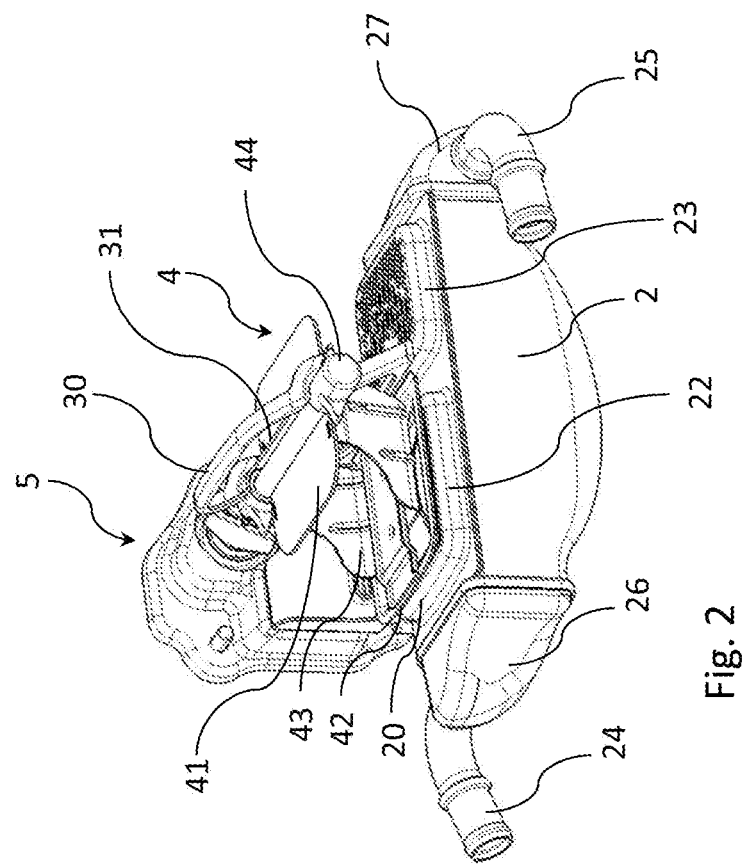
FIG. 2 shows a perspective view of the embodiment of the heat recovery component of FIG. 1 including an actuator without the bypass branch conduit.

FIGS. 2 and 3 show in partly sectional view an embodiment of the heat recovery component according to the present invention in the bypass mode. In particular, in these figures the bypass branch conduit has been removed to see the valve 4. The valve 4 has a bypass valve flap 41 and a heat recovery valve flap 42 comparatively connected by a support 43. The valve additionally has a valve shaft 44 around which rotational axis the valve is movable. The valve shaft 44 is arranged in the bypass branch 3 which has been removed in these figures. The valve unit comprises a bypass valve seat 30 which has an integrated cross member 31 next to the shaft. The integrated cross member 31 serves as a hard stop for the bypass valve flap 41 in bypass mode, assuring correct bypass flap angle, independently from flexible support deformation.

The valve 4 is moved by an actuator 5 which applies a rotational torque to the valve shaft 44. In the embodiment shown in FIG. 2, the actuator 5 is electric. The actuator 5 may be an electric or pneumatic or wax linear or rotating actuator.

In these figures, the heat recovery branch conduit comprises a heat exchanger (not shown in FIG. 2) which may be connected to a coolant circuit of the engine or of the transmission. The coolant circuit is connected via the heat exchanger cooling fluid inlet and outlet 24, 25 and the corresponding manifolds 26, 27 as shown in FIG. 2. The heat recovery branch has an inlet 22 and an outlet 23 in the hot exhaust gas to pass through the heat exchanger 21 when the heat recovery component 1 is in heat recovery mode. The elongated heat exchanger is arranged longitudinally along the bypass branch aligned with a direction from the inlet 11 to the outlet 12 of the heat recovery component 1. In FIG. 3, the heat exchanger 21 which in operation is in contact with the cooling fluid on one side and with the exhaust gas on the other side in the heat recovery mode is shown in detail.

The heat recovery component 1 comprises a bypass branch valve seat 30 which is arranged in the bypass branch conduit and is configured to receive the bypass valve flap 41. Similarly, the heat recovery component 1 also has a heat recovery branch valve seat 20 which is arranged at the inlet 22 of the heat recovery conduit.

The two valve flaps—the bypass valve flap 41 and the heat recovery valve flap 42—are connected to one another by a support 43. In particular, the support 43 is directly connected to the bypass valve flap 41, whereas the heat recovery valve flap 42 is flexibly attached to the support 43 in order to allow small movements of the heat recovery valve flap 42 in the plane of the rotational axis of the valve shaft 44. The two valve flaps 41, 42 are arranged with an angle of 2° to one another. In the bypass mode, the heat recovery valve flap 42 is parallel to the straight flow path 32. The bypass valve flap 41 on the other hand is arranged with an angle of 2° with respect to the straight flow path 32 of the exhaust gas in the bypass mode. Such angle allows for reducing the torque needed for the rotation for maintaining the valve in the desired position during operation by the use of compensation forces generated by the exhaust gas flow onto the bypass valve flap 41.

In the heat recovery mode, however, the bypass valve flap 41 rests against the bypass valve seat 30 and is arranged at an angle of 65° with respect to the straight flow path 32 of the exhaust gas. This angle has both the advantage of reducing the distance to be traveled by the valve 4 during rotation from the bypass mode to the heat recovery mode and vice versa and hence reduce operation time from one mode into the other and additionally has the advantage of positioning of the heat recovery valve flap 42 at an angle of 63° with respect to the straight flow path 32 of the exhaust gas when the heat recovery component 1 is in heat recovery mode. The heat recovery valve flap 42 is then arranged obliquely to the exhaust gas flow and hence provides a deflection of the exhaust gas towards the heat recovery branch 2 and thereby reduces pressure drop in the heat recovery component 1 when using the heat recovery mode.

When the heat recovery component 1 is in the bypass mode, as shown in FIGS. 2 and 3, the heat recovery valve flap is arranged outside of the flow path of the exhaust gas, thereby avoiding any unnecessary pressure drop.

In the embodiment of the valve 4 as shown in FIGS. 2 and 3, the bypass valve flap 41 is symmetrically arranged in opposite directions relative to the valve shaft 44. In this configuration, when the heat recovery component 1 is in the bypass mode, the exhaust gas will flow above and below the bypass valve flap 41 in significantly equal amounts. The bypass valve flap 41 may, however, also be designed asymmetrically, for example the surface of the bypass valve flap 41 projecting from one side of the valve shaft 44 may be significantly less than the surface of the bypass valve flap 41 arranged on the opposite side of the valve shaft 44. Such asymmetric arrangement of the bypass valve flap 41 may allow fine-tuning of the necessary rotational torque to be applied to the valve shaft 44 during operation of the heat recovery component 1 by the actuator 5 or may be used in order to design a failsafe behavior of the heat recovery component 1 in which the valve automatically falls into the bypass mode in case of failure of the component for avoiding overheating of the coolant fluid.

Figure 5:
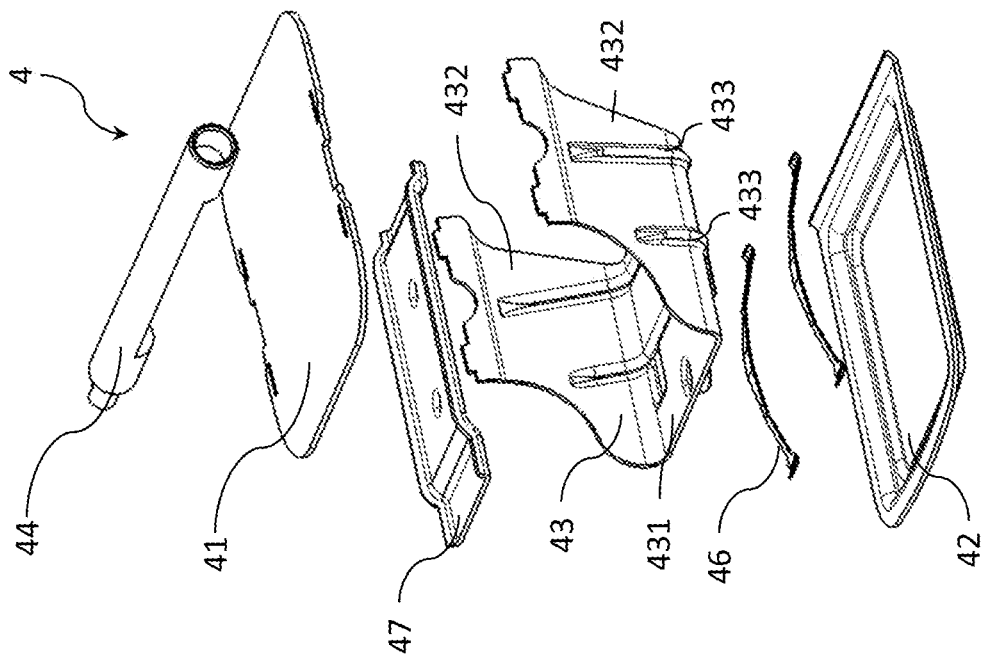
FIG. 5 shows an explosion view of the valve shown in FIG. 4.
Figure 4:
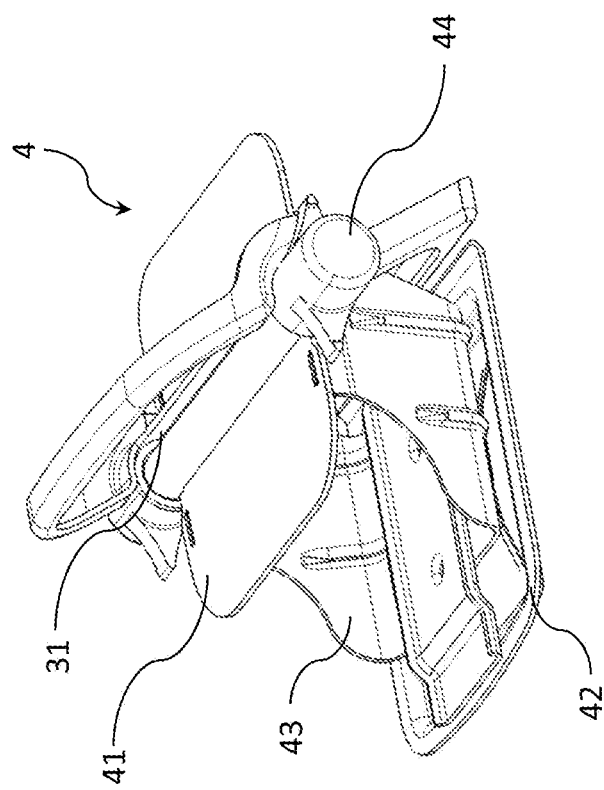
FIG. 4 shows a perspective detailed view of the valve according to the embodiment shown in FIGS. 2 and 3.

FIG. 4 shows the valve 4 of FIGS. 1 to 3 in detail and FIG. 5 shows an exploded view of the valve 4. In these figures, it can be clearly seen that the heat recovery valve flap 42 is flexibly arranged on the structure 43 by use of leaf springs 46. The structure 43 is basically formed from a metal sheet comprising a base 431 and two substantially parallel side walls 432. The metal sheet is provided with reinforcement ribs 433 arranged parallel to the side walls. The bar 47 allows for maintaining the heat recovery valve flap 42 in location in the resting position (no forces applied onto the heat recovery valve flap 42). The heat recovery valve flap 42 is thereby flexibly attached to the rigid structure 43 which is in turn fixedly and rigidly attached to the bypass valve flap 41. The bypass valve flap 41 is rigidly mounted onto the valve shaft 44 which may be rotated by the actuator. The flexible construction of the heat recovery valve flap 42 on the structure 43 in combination with the bar 47 allows for small movement of the heat recovery valve flap 42 in a plane of rotation of the valve 4. The heat recovery valve flap 42 therefore is floatably arranged onto the structure 43. In this embodiment too, the valve unit comprises a bypass valve seat 30 which has an integrated cross member 31 next to the shaft serving as a hard stop for the bypass valve flap 41 in bypass mode.

Figure 6:
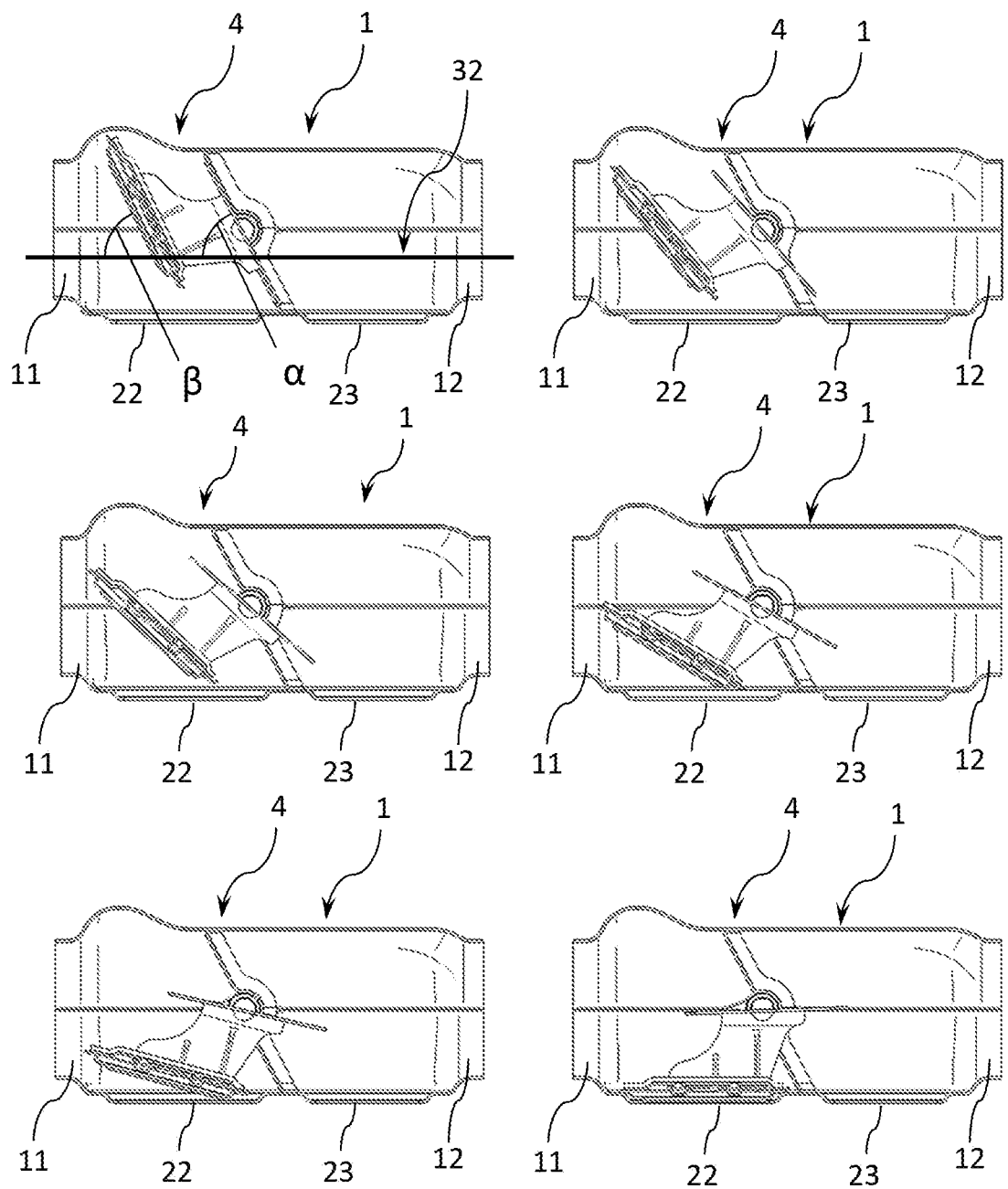
FIG. 6 shows a step by step movement of the rotation of the valve from the heat recovery end position to the bypass end position.

In FIG. 6, a step by step movement of the valve 4 from the heat recovery end position to the bypass end position is shown. The heat recovery valve flap 42 moves when contacting the heat recovery branch valve seat 20 during rotation of the valve. The movement of the heat recovery valve flap 42 is a combined sliding and rotational movement. The heat recovery valve flap 42 makes a first contact under an angle with respect to the heat recovery branch valve seat 20, after which it will make rotational and translational movement to its final closed position in the bypass mode, thereby making a sliding movement over the heat recovery branch valve seat 20. This sliding movement is particularly useful to increase the compactness and reduce the weight of the entire heat recovery component, as the distance compensated by the flexible arrangement of the heat recovery valve flap 42 of the valve 4 may be used to reduce the overall dimensions of the entire heat recovery component 1.

Once the valve is in the bypass end position, the flexible connection of the heat recovery valve flap allows for a tight closure of the heat recovery branch seat, thereby ensuring minimal parasitic heat to access to the heat exchanger 21 as well as to compensate for tolerance stack up of the different components in the construction.

The flexible connection of the heat recovery valve flap 42 in the valve 4 additionally allows to dispense from the use of a wire mesh, for example, attached to the heat recovery valve flap 42 or to the heat recovery branch valve seat 20 for improving tightness of the seal.

In this figure, the angles at which the valve flaps are positioned are shown. The two valve flaps 41, 42 are arranged with an angle of 2° to one another. In the heat recovery mode, the bypass valve flap 41 rests against the bypass valve seat 30 and is arranged at an angle $\alpha$ of 65° with respect to the straight flow path 32 of the exhaust gas, whereas the heat recovery valve flap is arranged at an angle $\beta$ of 63°.

In the bypass mode, the heat recovery valve flap 42 is parallel to the straight flow path 32 and the bypass valve flap 41 is arranged with an angle of 2° with respect to the straight flow path 32 of the exhaust gas in the bypass mode.

Figure 8:
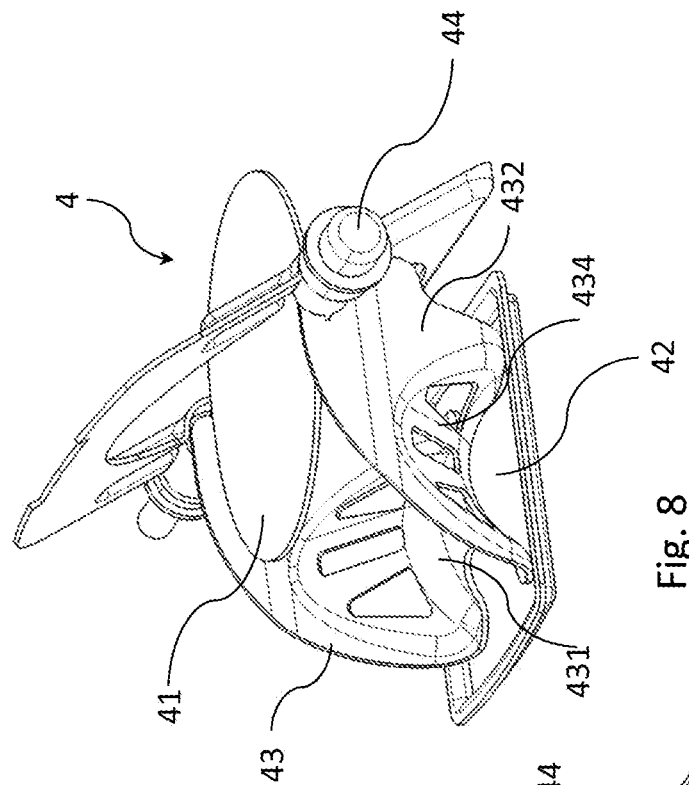
FIG. 8 shows a perspective detailed view of the valve according to the embodiment shown in FIG. 7.
Figure 7:
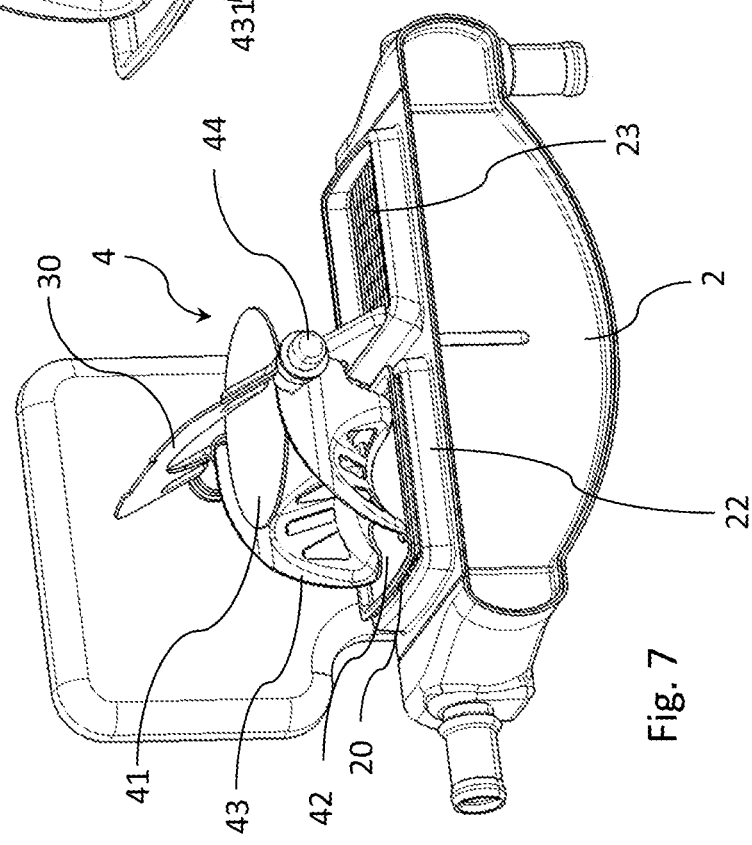
FIG. 7 shows a perspective view of another embodiment of the heat recovery component according to the invention without the bypass branch conduit

FIGS. 7 and 8 show another embodiment of the heat recovery component 1 according to the invention. In this embodiment, the heat recovery valve flap 42 is rigidly attached to the valve shaft 44. The structure 43 may be formed from a metal sheet and also comprises a base 431 and two substantially parallel side walls 432. However, the base 431 has the form of a tunnel and the side walls 432 each comprise a concave portion 434 with openings.

Figure 10:
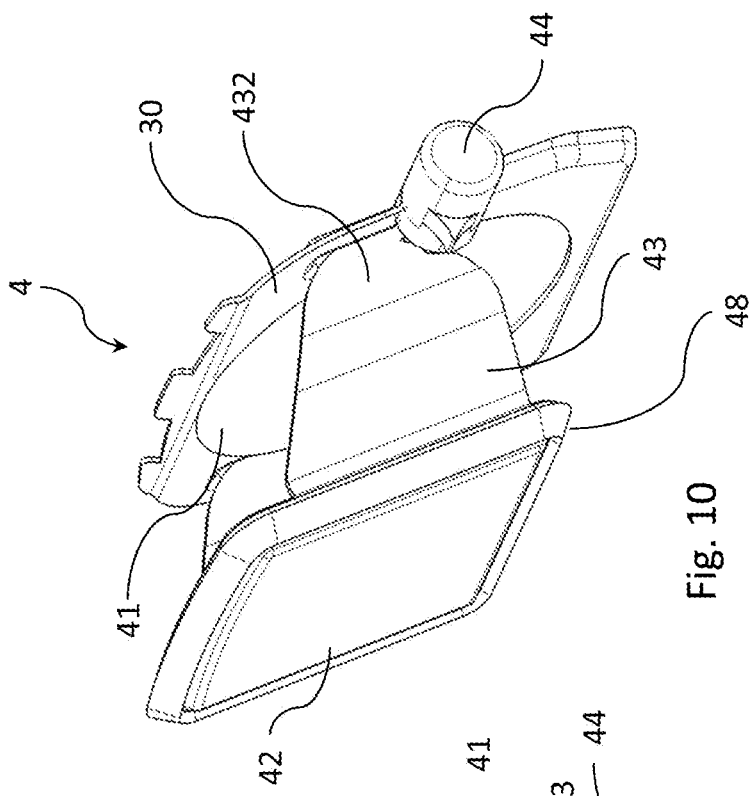
FIG. 10 shows a perspective detailed view of the valve according to the embodiment shown in FIG. 9.
Figure 9:
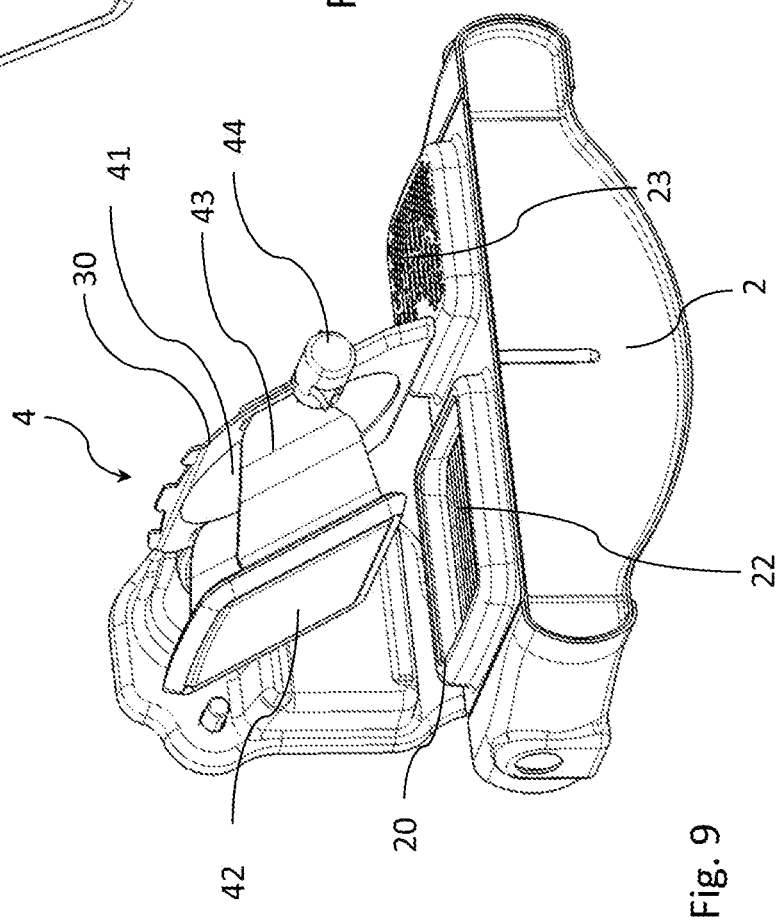
FIG. 9 shows a perspective view of a further embodiment of the heat recovery component according to the invention without the bypass branch conduit.

The rigid attachment to the valve shaft 44 (or to the bypass valve flap 41) may at least partly be compensated, as shown on FIGS. 9 and 10 by the use of a flexible wire mesh 48 arranged at the circumference of the heat recovery valve flap 42. Alternatively, the flexible wire mesh may also be arranged at the circumference of the heat recovery branch valve seat 20. In the embodiment of the heat recovery component shown in the FIGS. 9 and 10 the rigid support 43 has a very simple structure basically having a flat base 431 and two straight flat substantially parallel side walls 432.

Figure 12:
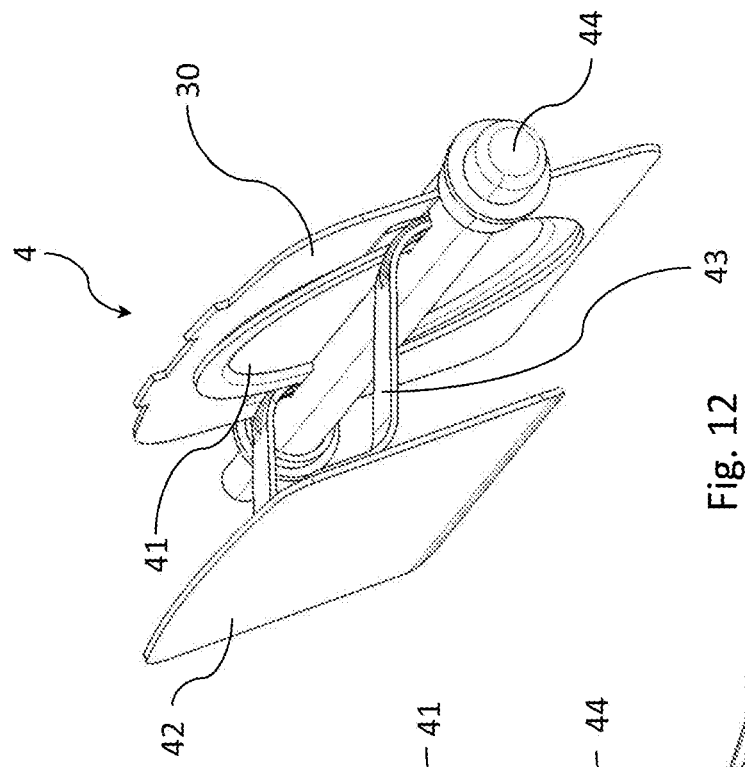
FIG. 12 shows a perspective detailed view of the valve according to the embodiment shown in FIG. 11.
Figure 11:
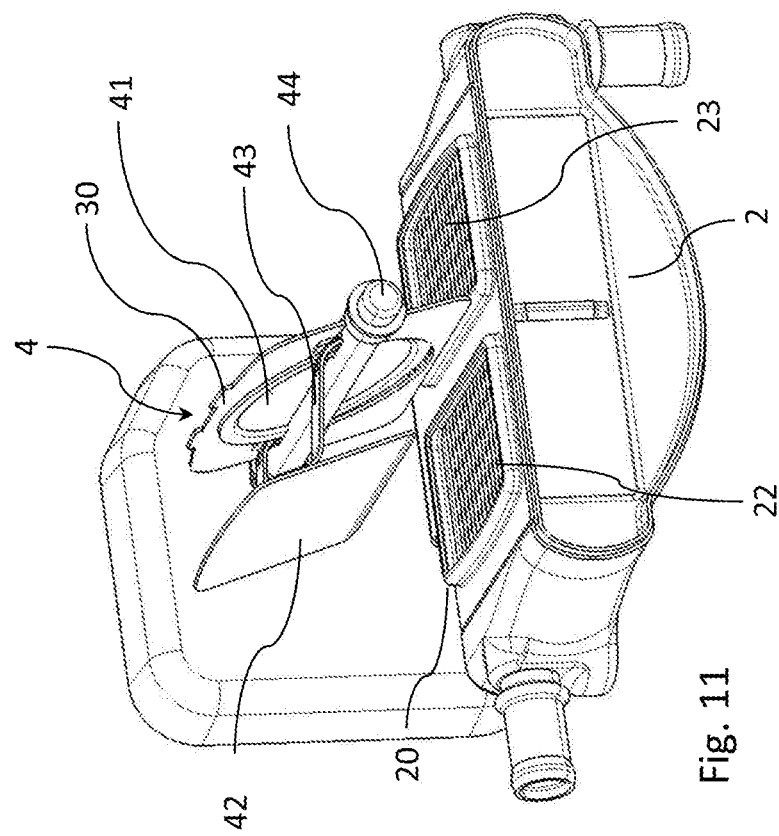
FIG. 11 shows a perspective view of an additional embodiment of the heat recovery component according to the invention without the bypass branch conduit.

In FIGS. 11 and 12, a further embodiment of the heat recovery component 1 according to the invention is shown. In this embodiment, the heat recovery valve flap 42 is attached to the valve shaft 44 (and to the bypass valve flap 41) via leaf springs 43 which form a flexible structure for the connection between the heat recovery valve flap 42 and the valve shaft 44 or the bypass valve flap 41. The leaf springs act as flexible arms which allow movement of the heat recovery valve flap 42 in a direction of rotation of the valve 4.

Figure 13:
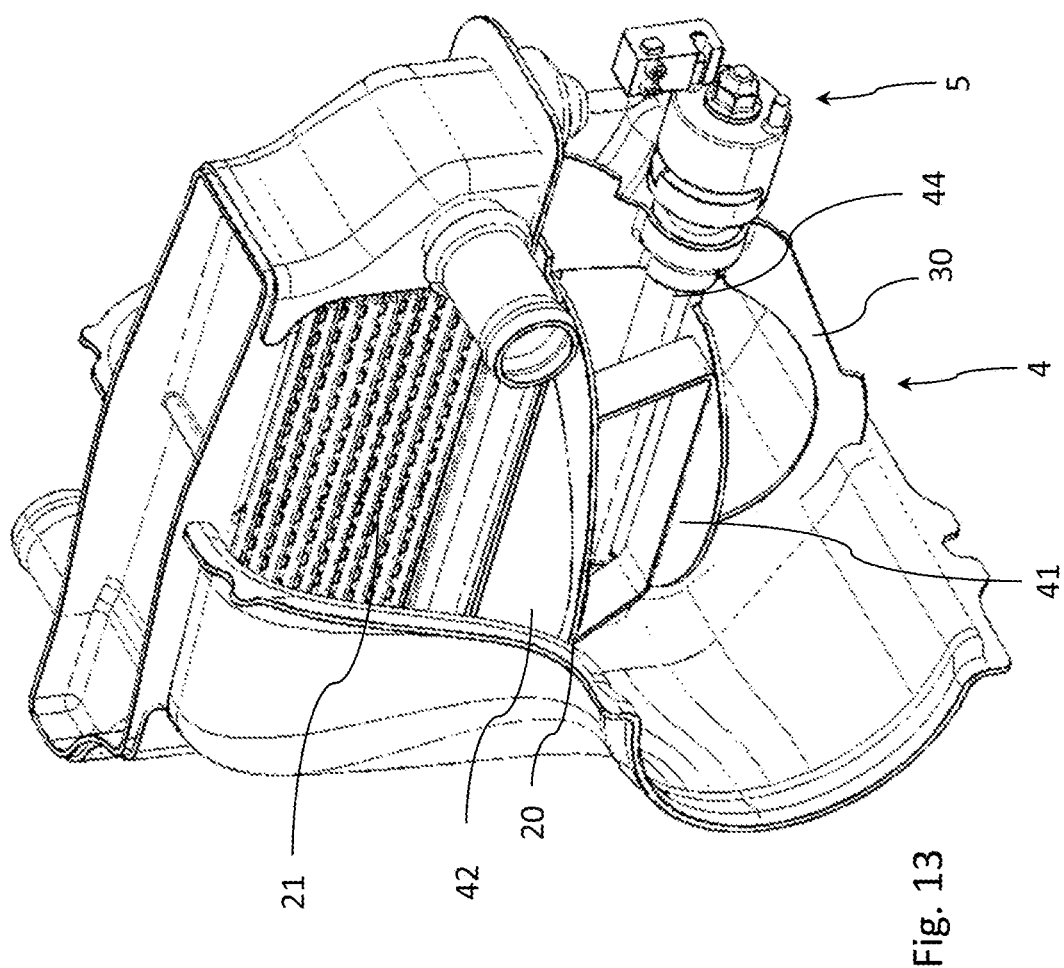
FIG. 13 shows a partly sectional perspective view of another embodiment of the heat recovery component according to the invention.
Figure 14:
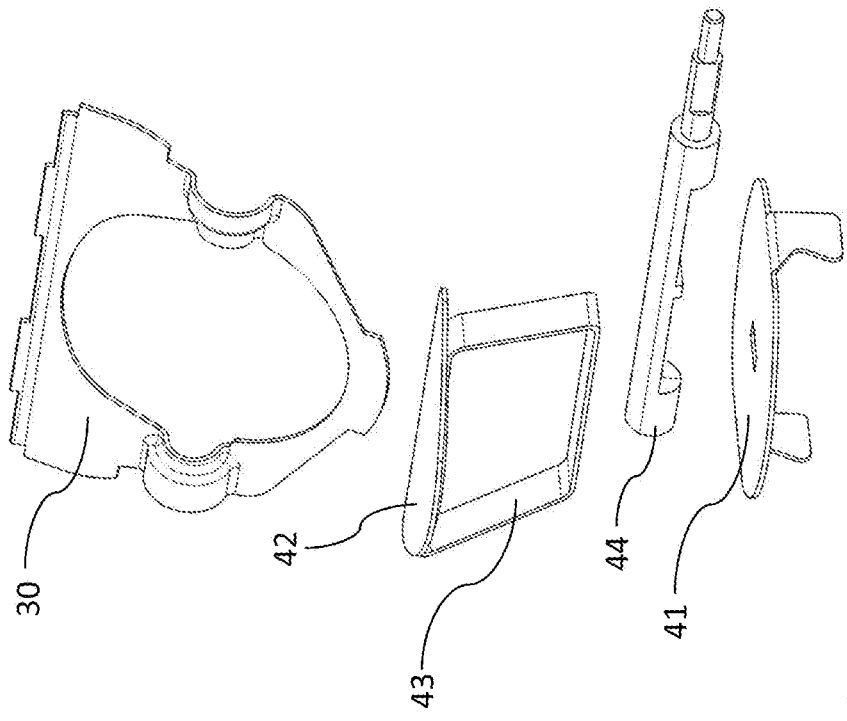
FIG. 14 shows a perspective detailed view of the valve according to the embodiment shown in FIG. 13.
Figure 15:
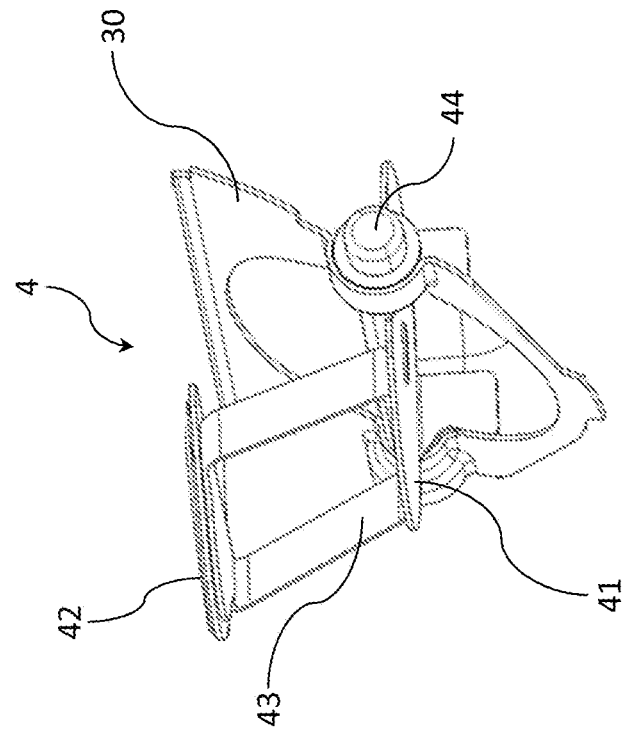
FIG. 15 shows an explosion view of the valve shown in FIG. 15.

FIGS. 13 to 15 show a further embodiment of the heat recovery component according to the invention in which the (elongated) heat exchanger 21 is arranged in a lateral direction to the flow path through the heat recovery component 1. Depending on the space available, this embodiment is slightly wider than the previous embodiments with the elongated heat exchanger 21 arranged in a longitudinal direction from the inlet 11 to the outlet 12 of the heat recovery component 1, however the total length of the heat recovery component 1 may be drastically shortened as can be seen on the FIG. 13. As can be seen from the FIGS. 14 and 15, the heat recovery valve flap 42 has a shape which is adapted to the shape of the inlet 22 of the heat recovery branch 2. In this embodiment, the heat recovery valve flap 42 (and the bypass valve flap 41) is rigidly connected to the rotatable common valve shaft 44. The support is formed by a small strip, for example of a metal sheet, forming a base, which is attached to the bypass valve flap 41, two side walls 432 extending from the base to a top and the top being directly attached to the heat recovery flap 42.

Figure 16:
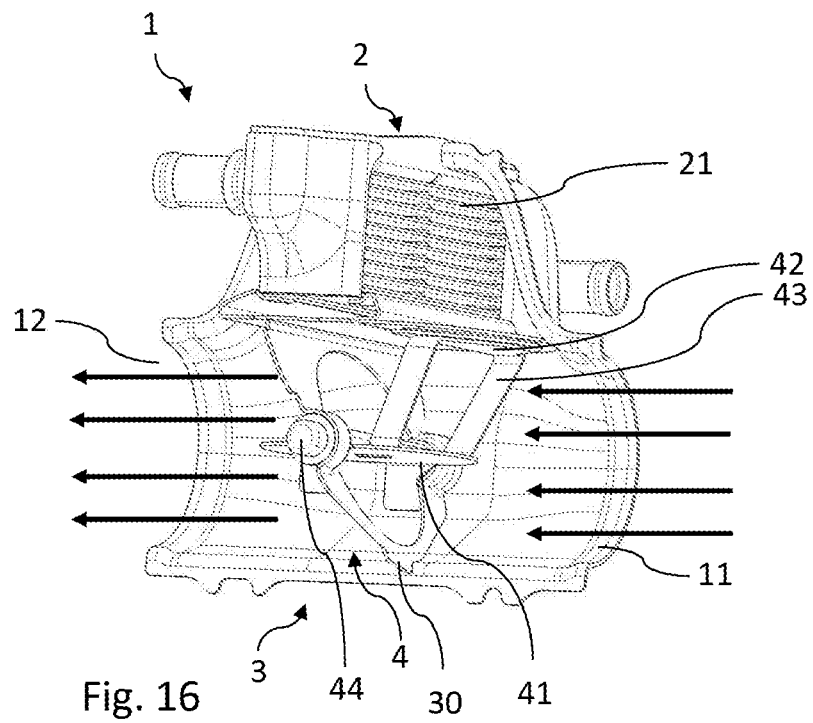
FIG. 16 shows a flow path through the heat recovery component of FIG. 15 in the bypass mode.
Figure 17:
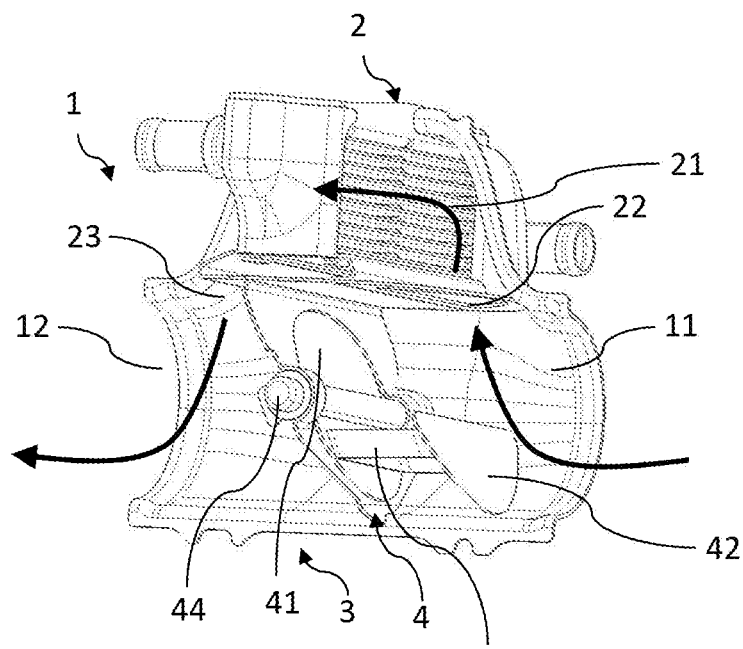
FIG. 17 shows the flow path through the heat recovery component of FIG. 15 in the heat recovery mode.
Figure 18:
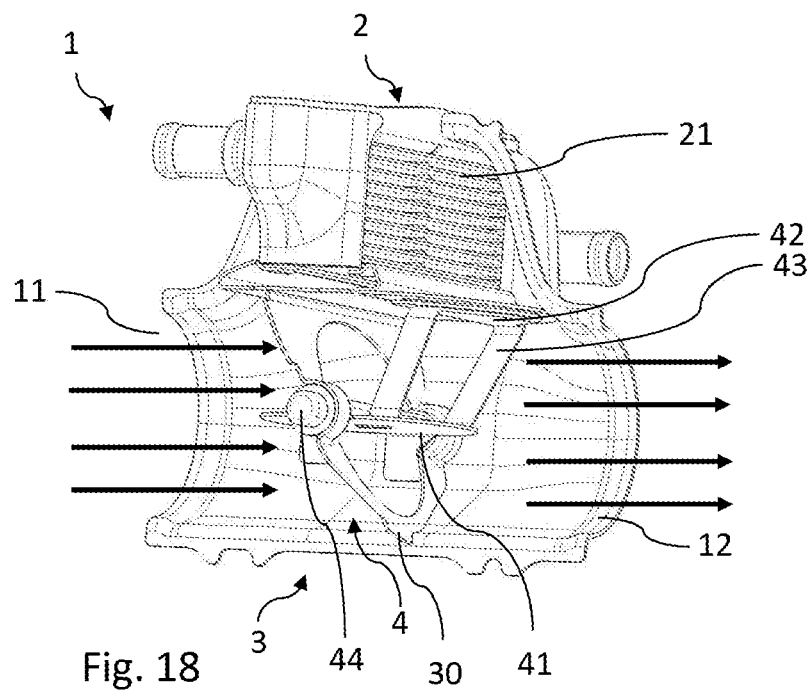
FIG. 18 shows an opposite flow path through the heat recovery component of FIG. 15 in the bypass mode.
Figure 19:
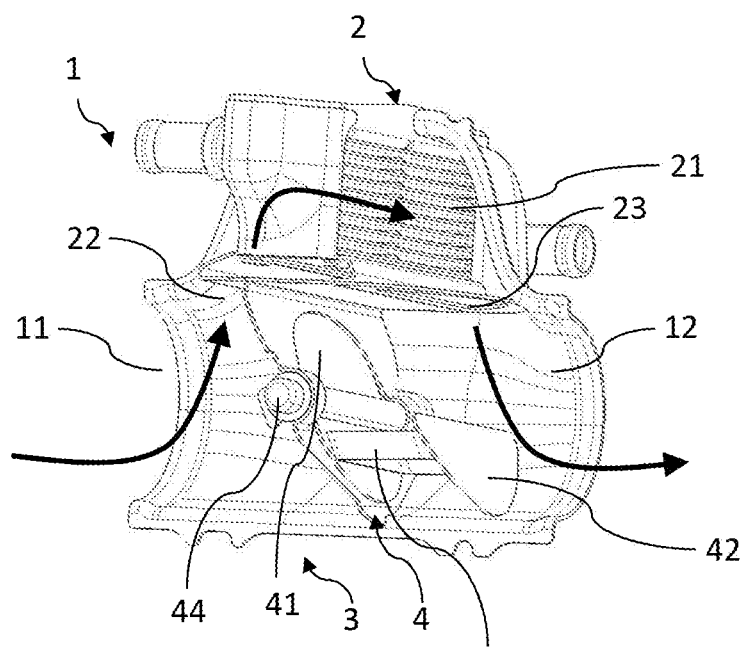
FIG. 19 shows the opposite flow path through the heat recovery component of FIG. 15 in the heat recovery mode.

FIGS. 16 to 19 show the heat recovery component 1 according to FIG. 13 in operation. The arrows show the flow path of the exhaust gas through the heat recovery component, in bypass mode (FIGS. 16 and 18) as well as in heat recovery mode (FIGS. 17 and 19).

As shown in FIG. 16, the exhaust gas enters the heat recovery component 1 in bypass mode and flows through the bypass branch conduit 3 to exit the heat recovery component 1. The heat recovery valve flap 42 is arranged outside of the exhaust gas flow in this mode. In the heat recovery mode, the exhaust gas is deflected by the obliquely arranged heat recovery valve flap 42 and conveyed to the heat recovery branch 2 through its inlet 22, passes through the heat exchanger 21 and exits the heat recovery branch 2 by its outlet 23 and subsequently exits the heat recovery component 1 through its outlet 12.

In the reverse flow as shown in FIGS. 18 and 19, the heat recovery is similar to that described for FIGS. 16 and 17 except that the oblique heat recovery valve flap 42 does not deflect the incoming exhaust gas but reduces the turbulences of the exhaust gas leaving the heat recovery branch 2 at its outlet 23 and minimizes pressure losses.

In the flow direction chosen for the heat recovery as shown in FIGS. 16 and 17, the particular advantage of the oblique heat recovery valve flap 42 for deflection of the exhaust gas to the heat recovery branch 2 in the heat recovery mode. Additionally, it may be seen that the oblique heat recovery valve flap allows for use of compensation forces during operation of the heat recovery component, thereby using the exhaust gas flow affecting the heat recovery valve flap 42 to reduce the torque needed for rotation of the valve 4.

FIGS. 16 and 17 versus FIGS. 18 and 19 show the versatility of the heat recovery component 1 according to the invention which may be used in either flow direction of the exhaust gas.

FIG. 20 shows a high precision heat recovery component 1 with rigid support 43 and rigid connection between heat recovery flap 42 and bypass flap 41. FIG. 20 shows the valve in the bypass end position with the inlet 22 of the heat recovery branch conduit 2 completely closed. Same reference signs are used for the same or similar elements. The rotational axis and shaft 44 of the valve are arranged on a middle axis 55 of the bypass branch conduit 3. The position of the rotational axis with respect to the inlet 22 of the heat recovery branch conduit or with respect of the heat recovery valve seat is chosen such that upon clockwise rotation of the valve the heat recovery flap 42 directly closes the inlet 22. Thus, no translational movement of the flap 42 to adjust the flap in the inlet is performed. The rigid construction of the support 43 allows for a pure rotational movement of the recovery valve flap 42 only.

FIG. 21 shows a low weight embodiment of the heat recovery component 1, for example used in combination with a wax actuator for operating the valve in the heat recovery component. In FIG. 21, the valve is in the heat recovery end position: The bypass valve flap 41 rests against the bypass valve seat 30. The inlet 22 of the heat recovery branch conduit 2 is open and exhaust gas is guided to the heat exchanger 21 in the heat recovery branch conduit.

Figure 22:
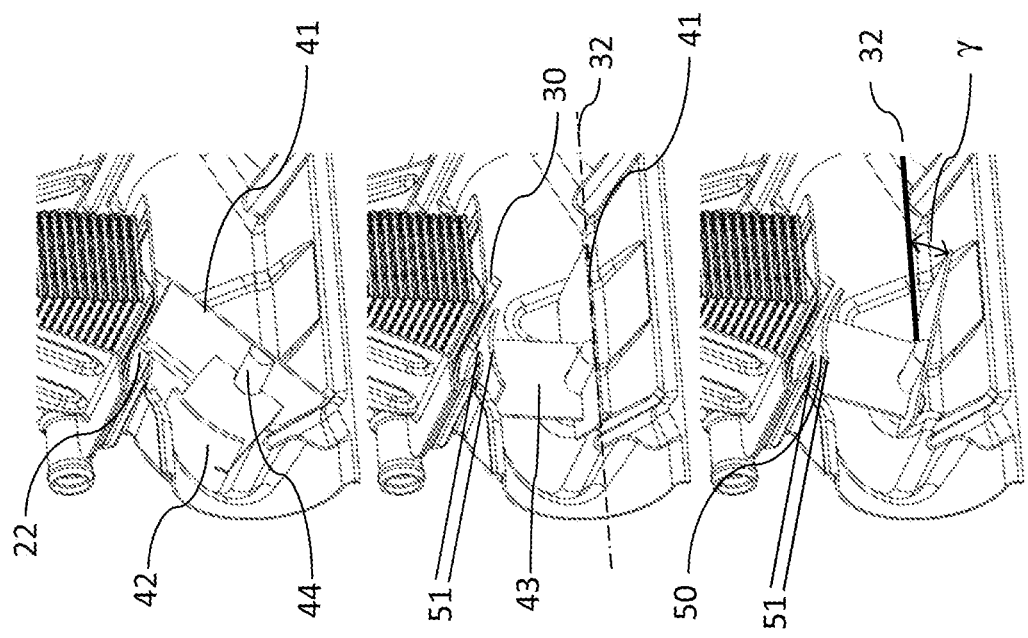
FIG. 22 shows the heat recovery component of FIG. 21 in different operational modes.

The bypass valve flap 41 is flat but the heat recovery flap 42 is curved and has a convex shape. The heat recovery flap 42 is connected via rigid support 43, two parallel flat metal sheets (only one sheet seen in the cut-open view through the vertical symmetry plane of the heat recovery component of FIG. 21, to the bypass valve flap 41 and the valve shaft 44. The position of the rotation axis of the valve is offset from the middle axis 55 of the bypass branch conduit 3 in a direction away from the inlet 22 of the heat recovery branch conduit 2. FIG. 22 shows the valve of FIG. 21 in operation from the heat recovery end position in the uppermost drawing over a regular bypass end position shown in the intermediate drawing to an overstroke bypass end position in the lowermost drawing.

The intermediate drawing shows the bypass valve flap 41 in a horizontal position parallel to a straight flow path 32 through the bypass conduit 3. In this position the heat recovery valve flap 42 is in its regular end position substantially arranged in front of the inlet 22 of the heat recovery branch conduit 2. This intermediate drawing corresponds to a wax actuator used for actuating the valve of this heat recovery component in a regular coolant operating temperature range.

The lowermost drawing shows the bypass valve flap 41 tilted with respect to the straight flow path 32 through the bypass branch conduit or to a middle axis 55 of the bypass branch conduit 3. The tilt amounts to about 20 degree from the straight flow path 32. In this overstroke position the heat recovery valve flap 42 is in its overstroke end position substantially arranged in front of the inlet 22 of the heat recovery branch conduit 2. The lowermost drawing corresponds to a wax actuator used for actuating the valve of this heat recovery component in an overheated maximum coolant temperature range.

In the intermediate as well as in the lowermost drawing where the heat recovery flap 42 is in the closed position, a leak passage 50 formed by the safety distance 51 between heat recovery flap 42 and inlet 22 may be seen. This leak passage 50 allows a small amount of exhaust gas of a maximum of about 15 percent, preferably of only about 4 percent of a total exhaust gas flow through the heat recovery component, to pass into the heat recovery branch conduit 2 in the bypass mode.

Figure 23:
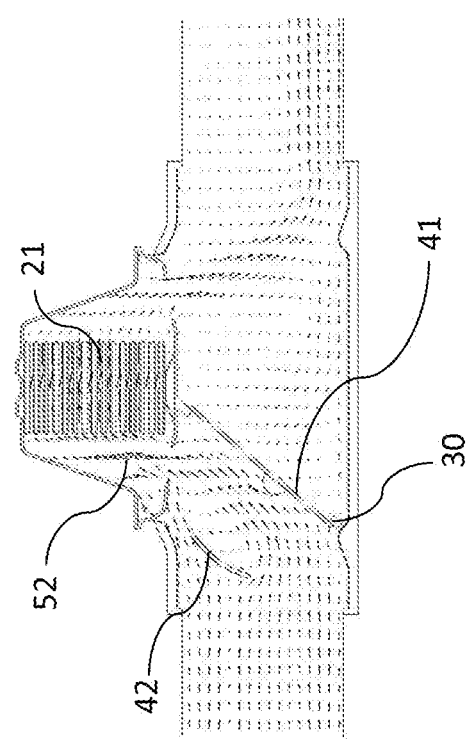
FIGS. 23-25 show exhaust gas flow profiles in the heat recovery component of FIGS. 21 and 22 in the heat recovery end position (FIG. 23), in the regular bypass end position (FIG. 24) and in the overstroke bypass end position (FIG. 25, FIG. 26 shows a flow profile in the heat recovery component similar to FIG. 21 wherein the heat recovery valve flap is provided with a gurney flap.
Figure 24:
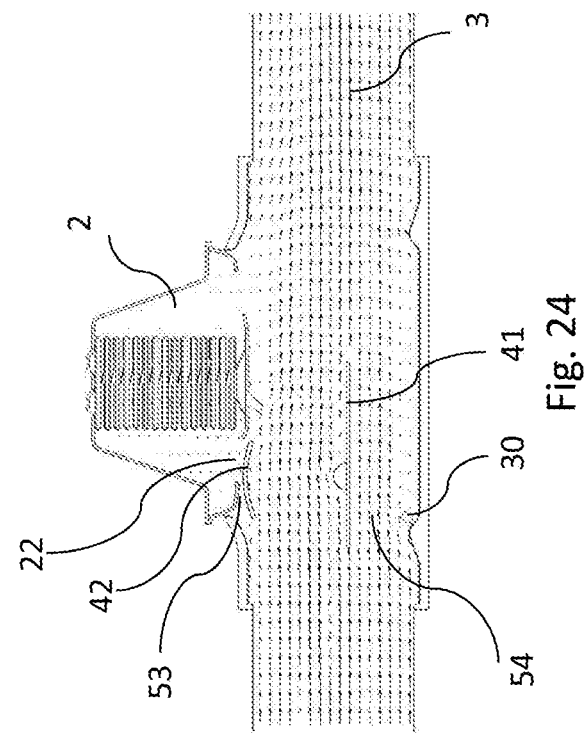
Figure 25:
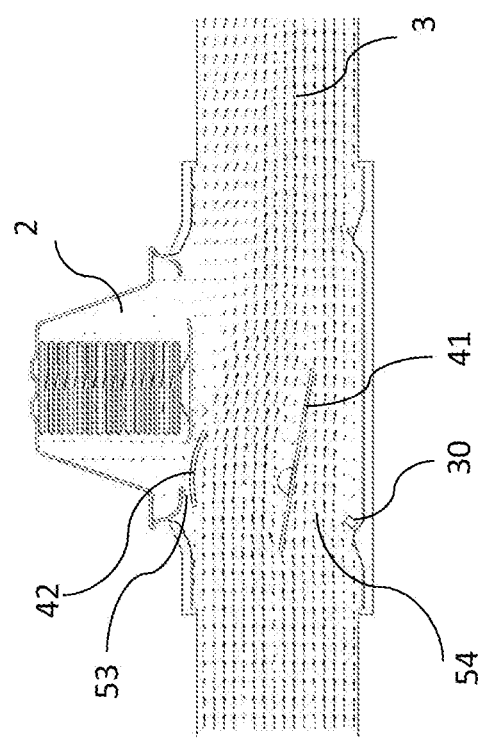

In FIGS. 23 to 25 a flow simulation in the heat recovery component of FIGS. 21 and 22 is shown. The flow is indicated by velocity vectors, wherein the arrows scale with the amplitude of the velocity. Thus, small arrows indicate a low velocity or little flow.

FIG. 23 shows the exhaust gas flow in the heat recovery component in the heat recovery end position, where all exhaust gas is led through the heat recovery branch conduit 2. Hot exhaust gas is deflected by the bypass valve flap 41 and guided to the inlet 22 of the heat recovery branch conduit. The heat recovery valve flap 42 and the support 43 (not seen) provide little flow resistance such that hot exhaust gas concentrates in the inlet region 52 of the heat exchanger 21. The low resistance by the support and valve in general may be seen in FIG. 24 and FIG. 25.

In FIGS. 24 and 25 the heat recovery component is in the regular bypass end position and overstroke end position, where almost the entire exhaust gas 54 flow flows through the bypass branch conduit 3. However, it may well be seen that a small amount of gas 53 passes through the opening between heat recovery flap and inlet 22 of heat recovery branch conduit 2 and through the inlet into the heat recovery conduit.

In FIG. 24 the bypass valve flap is arranged parallel to the exhaust gas flow 54 in the bypass branch conduit. In FIG. 25 the disturbance of the tilted bypass valve flap relative to the straight flow path may be seen.

Figure 26:
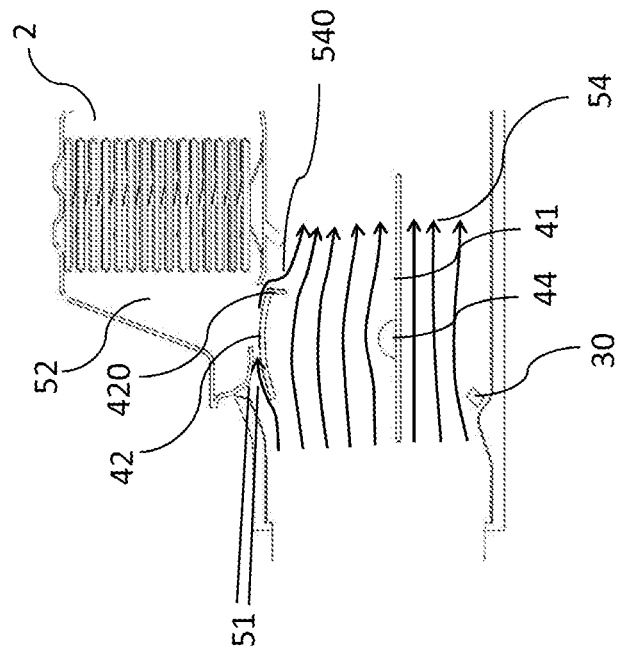

In FIG. 26 a partial flow profile in the heat recovery component similar to the heat recovery component of FIG. 21 with the valve in the regular bypass end position is shown. In the embodiment of FIG. 26, the heat recovery valve flap 42 is provided with a gurney flap 420 at its trailing edge. With a same safety distance 51, a smaller leak passage is formed due to the influence of the gurney flap 420. As is indicated by arrows in FIG. 27, a part of the flow 540 entering into the gap 53 is directed back into the bypass branch conduit under the effect of the gurney flap 420. Thereby, a leak passage thus a volume of exhaust gas flowing into the heat recovery branch conduit is reduced compared to the same heat recovery component with a recovery valve flap 42 without gurney flap 420.

For the flow simulations an exhaust gas temperature of about 750 degree Celsius was chosen. The coolant had a regular temperature of about 90 degree Celsius with a coolant flow of about 20 l/min. From the above description, it can be seen that an improved heat recovery component is provided which is capable of recovering very efficiently the thermal energy in the exhaust gas with a very compact and versatile construction allowing for better efficiency of the component.

The invention claimed is:

1. A heat recovery component for an exhaust gas system of an internal combustion engine, the heat recovery component comprising:
    an inlet for exhaust gas to enter the heat recovery component;
    an outlet for exhaust gas to exit the heat recovery component;
    a heat recovery branch conduit, the heat recovery branch conduit comprising a heat recovery branch conduit inlet being in fluidal connection with the inlet of the heat recovery component, a heat recovery branch conduit outlet being in fluidal connection with the outlet of the heat recovery component, and a heat exchanger arranged in the heat recovery branch conduit;
    a bypass branch conduit being in fluidal connection with the inlet and the outlet of the heat recovery component, the bypass branch conduit being separate from the heat recovery branch conduit, the bypass branch conduit allowing exhaust gas flowing through the bypass branch conduit to bypass the heat recovery branch conduit;
    a valve being configured to be rotatable between a heat recovery end position, in which the valve allows exhaust gas to only flow through the heat recovery branch conduit, and a bypass end position, in which the valve allows exhaust gas to flow through the bypass branch conduit, the valve being arranged to be rotatable around a rotation axis located in the bypass branch conduit and not in the heat recovery branch conduit,
    wherein the valve comprises a valve shaft, a bypass valve flap and a heat recovery valve flap, the bypass valve flap projecting radially from opposite sides of the valve shaft,
    wherein the bypass valve flap is configured to open and close the bypass branch conduit and the heat recovery valve flap is configured to open and close the heat recovery branch conduit, and
    wherein the bypass valve flap and the heat recovery valve flap are operatively connected by a support.

2. The heat recovery component according to claim 1, wherein the valve shaft is a rotatable common valve shaft, wherein the bypass valve flap and the heat recovery valve flap being operatively connected by the support are arranged on the rotatable common valve shaft, and wherein the rotatable common valve shaft is arranged in the bypass branch conduit.

3. The heat recovery component according to claim 1, wherein the support comprises at least one flat element extending between bypass valve flap and heat recovery valve flap.

4. The heat recovery component according to claim 3, wherein in the bypass end position of the valve, the valve allows exhaust gas to only flow through the bypass branch conduit or the valve allows exhaust gas to also flow through the heat recovery branch conduit to a maximum of 15 percent of a total exhaust gas flow flowing through the heat recovery branch.

5. The heat recovery component according to claim 3, wherein the at least one flat element is arranged parallel to a fluid flow through the valve.

6. The heat recovery component according to claim 1, wherein the heat recovery component comprises a bypass branch valve seat arranged in the bypass branch conduit for receiving the bypass valve flap and/or comprises a heat recovery branch valve seat arranged at the inlet or at the outlet of the heat recovery conduit for receiving the heat recovery valve flap.

7. The heat recovery component according to claim 1, wherein the heat recovery valve flap is rigidly connected to the bypass valve flap.

8. The heat recovery component according to claim 7, wherein the heat recovery valve flap is rigidly connected to the bypass valve flap by the heat recovery valve flap being rigidly arranged on a rigid support.

9. The heat recovery component according to claim 1, wherein the heat recovery valve flap comprises a flexible seal arranged at the circumference of the heat recovery valve flap or wherein a heat recovery valve seat comprises a flexible seal.

10. The heat recovery component according to claim 1, wherein the bypass branch conduit has a bypass branch conduit inlet being in fluidal connection with the inlet of the heat recovery component, and a bypass branch conduit outlet being in fluidal connection with the outlet of the heat recovery component and defining a straight flow path from the bypass branch conduit inlet to the bypass branch conduit outlet, and wherein the bypass valve flap has a surface and wherein in the bypass end position the surface of the bypass valve flap is in a position between −10° to 20° with respect to the straight flow path.

11. The heat recovery component according to claim 1, wherein the bypass branch conduit has a bypass branch conduit inlet being in fluidal connection with the inlet of the heat recovery component, and a bypass branch conduit outlet being in fluidal connection with the outlet of the heat recovery component and defining a straight flow path from the bypass branch conduit inlet to the bypass branch conduit outlet, and wherein the heat recovery valve flap has a surface and wherein in the heat recovery end position the surface of the heat recovery valve flap is arranged at an angle from 45° to 90° relative to the straight flow path.

12. The heat recovery component according to claim 10, wherein in the bypass end position the surface of the bypass valve flap is in a position between 0° and 2.5° with respect to the straight flow path.

13. The heat recovery component according to claim 11, wherein the bypass valve flap has a surface and wherein the surface of the bypass valve flap in the heat recovery end position is arranged at an angle from 45° to 90°-with respect to the straight flow path.

14. The heat recovery component according to claim 1, wherein the bypass branch conduit has a bypass branch conduit inlet being in fluidal connection with the inlet of the heat recovery component, and a bypass branch conduit outlet being in fluidal connection with the outlet of the heat recovery component and defining a straight flow path from the bypass branch conduit inlet to the bypass branch conduit outlet, and wherein the bypass valve flap has a surface and wherein the surface of the bypass valve flap in the heat recovery end position is arranged at an angle from 45° to 90° with respect to the straight flow path.

15. The heat recovery component according to claim 1, wherein in the bypass end position of the valve, the heat recovery valve flap is located in a position outside of a bypass flow path.

16. The heat recovery component according to claim 1, wherein the bypass valve flap is arranged in the bypass branch conduit.

17. The heat recovery component according to claim 1, wherein in the bypass end position of the valve, the valve allows exhaust gas to only flow through the bypass branch conduit or the valve allows exhaust gas to also flow through the heat recovery branch conduit to a maximum of 15 percent of a total exhaust gas flow flowing through the heat recovery branch.

18. A vehicle comprising a heat recovery component according to claim 1.

19. The heat recovery component according to claim 1, wherein a surface of the bypass valve flap and a surface of the heat recovery valve flap are arranged parallel or substantially parallel to each other.

20. The heat recovery component according to claim 1, wherein the bypass branch conduit is thermally separated from the heat recovery branch conduit by an air gap.

21. The heat recovery component according to claim 1, wherein the bypass branch conduit is thermally separated from the heat recovery branch conduit by a thermal insulating material.

* * * * *